United States Patent
Shigemura

(10) Patent No.: US 6,667,795 B2
(45) Date of Patent: Dec. 23, 2003

(54) HEAD UNIT, DISPLAY DEVICE PANEL MANUFACTURING APPARATUS FOR MANUFACTURING PANEL FOR DISPLAY DEVICE USING THE HEAD UNIT, MANUFACTURING METHOD THEREOF, MANUFACTURING METHOD OF LIQUID CRYSTAL DISPLAY DEVICE HAVING COLOR FILTER, AND DEVICE HAVING THE LIQUID CRYSTAL DISPLAY DEVICE

(75) Inventor: Yoshihiro Shigemura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 09/860,461

(22) Filed: May 21, 2001

(65) Prior Publication Data

US 2002/0044163 A1 Apr. 18, 2002

(30) Foreign Application Priority Data

May 23, 2000 (JP) ............................ 2000-151374

(51) Int. Cl.⁷ ....................... G02F 1/13; G02F 1/1341; B41J 2/21
(52) U.S. Cl. ....................... 349/187; 349/189; 349/106; 347/43
(58) Field of Search ............... 349/187, 189, 349/106; 347/43

(56) References Cited

U.S. PATENT DOCUMENTS

| | | |
|---|---|---|
| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |
| 4,608,577 A | 8/1986 | Hori |
| 4,723,129 A | 2/1988 | Endo et al. |
| 4,740,796 A | 4/1988 | Endo et al. |
| 6,164,746 A | * 12/2000 | Akahira et al. ............... 347/15 |
| 6,244,702 B1 | * 6/2001 | Sakino et al. ............... 347/106 |
| 6,331,384 B1 | * 12/2001 | Satoi ............... 430/347 |
| 6,364,450 B1 | * 4/2002 | Yamaguchi et al. .......... 347/24 |
| 2002/0105688 A1 | * 8/2002 | Katagami et al. ........... 358/505 |
| 2002/0109741 A1 | * 8/2002 | Okabe et al. ................. 347/14 |

FOREIGN PATENT DOCUMENTS

| | | |
|---|---|---|
| JP | 54-56847 | 5/1979 |
| JP | 59-75205 | 4/1984 |
| JP | 59-123670 | 7/1984 |
| JP | 59-138461 | 8/1984 |
| JP | 60-71260 | 4/1985 |
| JP | 63-235901 | * 9/1988 |
| JP | 63-294503 | * 12/1988 |
| JP | 1-217302 | * 8/1989 |
| JP | 9-49919 | * 2/1997 |

* cited by examiner

Primary Examiner—Toan Ton
Assistant Examiner—Mike Qi
(74) Attorney, Agent, or Firm—Fitzpatrick, Cella, Harper & Scinto

(57) ABSTRACT

A color filter is colored using a head unit comprising a head mounting portion whereupon multiple ink jet heads are mounted and a position adjusting device capable of adjusting the distance between the ink jet heads by moving the ink jet heads in the nozzle row direction such that this distance is a natural multiple of the nozzle pitch. This configuration allows for easy positional adjustment between the head units even in the event that the number of heads used is increased, so the advantages of reduction in manufacturing time due to the increase in heads used can be sufficiently achieved. Preventing the amount of time necessary for positioning an increased number of heads from becoming prolonged provides for a color filter manufacturing apparatus whereby manufacturing time can be sufficiently reduced.

60 Claims, 29 Drawing Sheets

PIXEL PATTERN ARRAY (COLOR PATTERN)
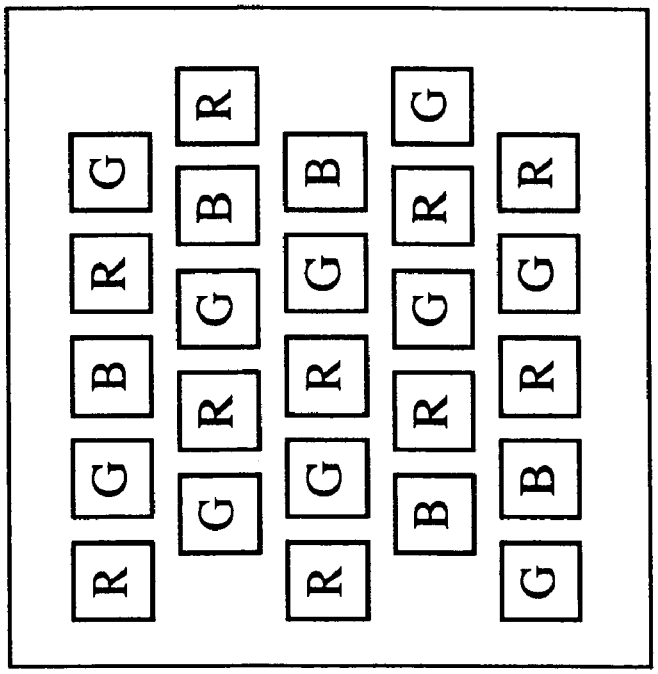
FIG. 12B DELTA ARRAY
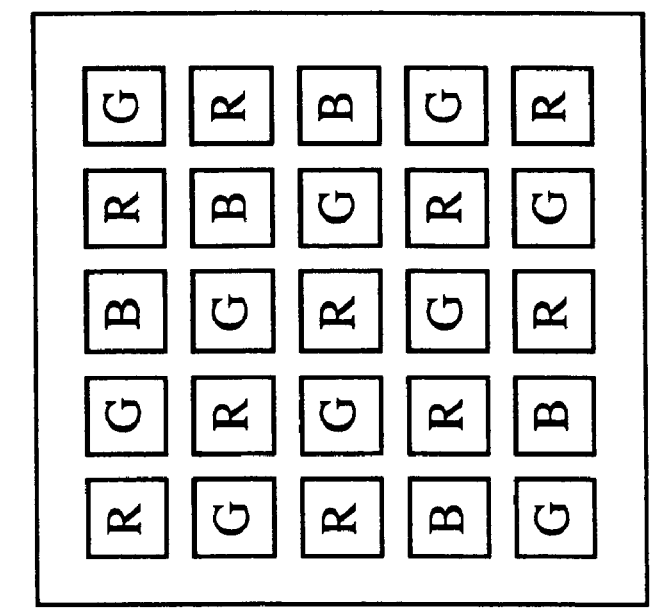
FIG. 12A MOSAIC ARRAY

HEAD UNIT, DISPLAY DEVICE PANEL MANUFACTURING APPARATUS FOR MANUFACTURING PANEL FOR DISPLAY DEVICE USING THE HEAD UNIT, MANUFACTURING METHOD THEREOF, MANUFACTURING METHOD OF LIQUID CRYSTAL DISPLAY DEVICE HAVING COLOR FILTER, AND DEVICE HAVING THE LIQUID CRYSTAL DISPLAY DEVICE

BACKGROUND OF THE INVENTION

1. Field of the Invention

The present invention relates to a head unit used for discharging a liquid (ink or EL (electroluminescence) display material) toward a substrate from a liquid head so as to manufacture display device panels containing color filters, EL display devices, etc., an apparatus for manufacturing panels for display devices containing color filters, EL display devices, etc., using the head unit, the manufacturing method thereof, manufacturing method for liquid crystal display devices having color filters, and devices having the liquid crystal display devices.

2. Description of the Related Art

Liquid discharging heads (ink jet heads) can be freely controlled as to the position and amount of liquid (ink) discharged, and accordingly are not only used for common printing purposes, but are further applied to various industries, primarily color filter manufacturing. The following is a description of color filter manufacturing with the ink jet method, which is a representative usage of the present invention.

Advancements in personal computers, particularly in portable personal computers, have led to an increase in liquid crystal displays, particularly in color liquid crystal displays. However, the cost of liquid crystal displays needs to be reduced for even further widespread use, and there is increasing demand for reduction in the cost of color liquid crystal displays, which tend to be more expensive than other display devices because of their quality. Heretofore, various attempts have been made to satisfy the above demands for reductions in cost while satisfying the required properties of the color filter, but no method has yet been established which satisfies all demands. The following is a description of several color filter manufacturing methods.

A first color filter manufacturing method is the dyeing method. The dyeing method involves coating a glass substrate with a water-soluble polymer material, which is the dyeing material, and the water-soluble polymer material is patterned into a desired form by photolithography, following which the obtained pattern is dipped in a dye bath so as to obtain a colored pattern. This process is performed three times, thereby obtaining a color filter layer of R (red), G (green), and B (blue) on the glass substrate.

A second color filter manufacturing method is the pigment dispersion method, which has come to be used most widely in recent years. The pigment dispersion method involves forming a photosensitive resin layer wherein pigment is dispersed on a glass substrate, and patterning this layer, thereby obtaining a monochromatic pattern. This is repeated once for each color, for a total of three times, thereby forming an RGB color filter layer.

A third color filter manufacturing method is the electrocoating method. The electrocoating method involves patterning transparent electrodes on a glass substrate, following which the glass substrate is dipped in an electrocoating paint fluid containing pigment, resin, electrocoating fluid, etc., so as to perform electrocoating of a desired color. This process is repeated for each color so as to apply the colors of R, G, and B on the substrate, following which the resin is thermally hardened, thus forming a colored layer on the substrate.

A fourth color filter manufacturing method is the printing method. The printing method involves printing with a pigment dispersed in a thermally hardening resin three times so as to color the colors for R, G, and B, following which the resin is thermally hardened, thus forming a colored layer on the substrate.

Each of the above methods usually is followed by forming a protective layer on the surface of the colored layer.

All four of these methods share one point: that the same process must be performed three times in order to color the three colors R, G, and B, which means that the great number of processes decreases yield, increases costs, and so forth, which are shortcomings that have been pointed out. Further, with the electrocoating method, the form of patterns which can be formed are limited, so application to TFT-type color liquid crystal displays is difficult. Also, the printing method has poor resolution and smoothness, and thus has shortcomings in that producing finer patterns is difficult, and so forth.

In order to supplement these shortcomings, Japanese Patent Application Laid-Open No. 59-75205, Japanese Patent Application Laid-Open No. 63-235901, Japanese Patent Application Laid-Open No. 63-294503, and Japanese Patent Application Laid-Open No. 1-217302 disclose methods for forming a color filter using the ink jet method. These methods involve ejecting inks containing coloring matter of the three colors R (red), G (green), and B (blue), on a photo-transmitting substrate by the ink jet method, and drying the inks so as to form filter elements. With an ink jet method such as this, the filter elements for R, G, and B can be formed all at once, leading to marked simplification of the manufacturing process, and great reductions in costs.

Now, when forming color filters with the ink jet method, there is the need to position the head having multiple ink discharge orifices and the substrate in a highly precise manner. However, the above publications do not take into consideration the production aspects of mass-producing such color filters, and accordingly the color filters cannot be manufactured in a stable manner. That is to say, the above publications are insufficient with regard to mass-production of the color filters.

In order to improve such insufficiencies, Japanese Patent Application Laid-Open No. 9-49919 discloses positioning heads having multiple ink discharging orifices and the substrate in a highly precise manner, thereby improving the production of color filters. According to this publication, of the three RGB heads, one color head is used as a reference and the other two color heads are positioned relative to that head beforehand, and are fixed at the time of printing, so that positioning of heads having multiple ink discharging orifices and the substrate can be performed in a highly precise manner, thus improving production of color filters.

Now, recent advancements in liquid crystal device manufacturing technology have led to increased size of glass substrates and image size (i.e., color filter size), and finer pixels. Conventionally, the size of glass substrates has been around 360 mm×465 mm, but recently this has increased to around 550 mm×650 mm, 680 mm×880 mm, and 730 mm×920 mm. The screen size has also been increasing yearly in a corresponding manner, such as 10.4 inch, 12.1 inch, 13.3 inch, 14.1 inch, 15.0 inch, 17.0 inch, 18.0 inch, and 20.0 inch screens. Further, the number of pixels of the color filters has been increasing in the manner of VGA (640×480), SVGA (800×600), XGA (1024×768), SXGA (1280×1024), SXGA+ (1400×1050), UXGA (1600×1200), and QXGA (2048×1536). Thus, color filters are increasing in resolution and fineness.

In the event of using such large-size substrates and manufacturing color filters for large-size screens with fine displays, the amount of time necessary for manufacturing each color filter is longer than that for conventional color filters with smaller screen sizes and lower resolution. An arrangement for realizing reduction in manufacturing time and further improving productivity can be conceived wherein a great number of heads for discharging ink of the same color are used. However, Japanese Patent Application Laid-Open No. 9-49919 only mentions using one head per color per head unit, and does not make description of what sort of head configuration would be used in the event that multiple heads of for the same color were to be used on one head unit.

In the event of manufacturing a color filter using multiple heads of the same color, the present inventor has found that simply using multiple heads would lead to increased time necessary for head positioning, which would counter the object of reduction in manufacturing time to be realized by the increased number of heads used, and accordingly improvement in the production of color filters would not be sufficiently accomplished. In other words, increasing the number of heads used would be meaningless if it requires a long time to position the heads relative to one another, and accordingly the present inventor has noted that a head unit having multiple heads of the same color must also comprise a mechanism wherein positioning of the heads relative to one another can be performed in a simple manner and particularly without taking much time. Note that the above description has been made with reference to an example of manufacturing a color filter, but the same can be used in manufacturing EL devices formed by applying self-illuminating material (EL light-emitting material) in recession surrounded by partitions provided upon a substrate. However, in the case of EL display devices, what is necessary is not a mechanism for positioning heads discharging ink of the same color relative to one another, but a mechanism for positioning heads discharging self-illuminating material which emits light of the same color; relative to one another. Further other than such color filters and EL display devices, the same can be used in manufacturing display device panels formed by discharging display material on a substrate.

SUMMARY OF THE INVENTION

The present invention has been made in consideration of the above problems, and accordingly it is an object thereof to provide a head unit, a manufacturing apparatus using the head unit for manufacturing display device panels (color filters, EL display devices, etc.), a manufacturing method thereof, a manufacturing method for liquid crystal display devices having color filters, and a manufacturing method for devices having the liquid crystal display devices, wherein, even in the event that the number of heads used is increased, prolonged periods of time are not necessary for adjusting the positions of the heads one with another, so as to reduce manufacturing time sufficiently, and wherein production of display device panels such as color filters and EL display devices is improved.

To this end, according to a first aspect of the present invention, a head unit used with an apparatus for manufacturing a panel for a display device comprising a plurality of display units, wherein the head unit and a substrate are scanned relatively while applying liquid to pixel areas on the substrate from the head unit, comprises: a first liquid discharging head comprising a first liquid discharging orifice row including multiple liquid discharging orifices; a second liquid discharging head comprising a second liquid discharging orifice row including multiple liquid discharging orifices; a head mounting unit for arraying the first liquid discharging head and the second liquid discharging head in the same direction such that the first liquid discharging orifice row and the second liquid discharging orifice row are positioned in the same direction; and position adjusting means for adjusting a relative position of the first liquid discharging head and the second liquid discharging head by moving at least one of the first liquid discharging head and the second liquid discharging head in the direction of the first and second liquid discharging orifice rows; wherein the position adjusting means effects adjusting such that a spacing between a first liquid discharging orifice of the first liquid discharging head and a first liquid discharging orifice of the second liquid discharging head is N times (wherein N is a natural number) the pitch of the liquid discharging orifices of the first liquid discharging head.

According to a second aspect of the present invention, a head unit used with an ink jet recording device which records by relatively scanning the head unit and a recording medium while applying ink onto the recording medium, comprises: a first ink jet head comprising a first ink discharging orifice row including multiple ink discharging orifices; a second ink jet head comprising a second ink discharging orifice row including multiple ink discharging orifices; a head mounting unit for arraying the first ink jet head and the second ink jet head in the same direction such that the first ink discharging orifice row and the second ink discharging orifice row are positioned in the same direction; and position adjusting means for adjusting a relative position of the first ink jet head and the second ink jet head by moving at least one of the first ink jet head and the second ink jet head in the direction of the first and second ink discharging orifice rows, wherein the position adjusting means effects adjusting such that a spacing between a first ink discharging orifice of the first ink jet head and a first ink discharging orifice of the second ink jet head is N times (wherein N is a natural number) the pitch of the ink discharging orifices of the first ink jet head.

According to a third aspect of the present invention, a display device panel manufacturing apparatus for manufacturing panels for a display device comprising a plurality of display units, wherein a head unit and a substrate are scanned relatively while applying liquid to pixel areas on the substrate, comprises: a head unit comprising a first liquid discharging head comprising a first liquid discharging orifice row including multiple liquid discharging orifices, a second liquid discharging head comprising a second liquid discharging orifice row including multiple liquid discharging orifices, a head mounting unit for arraying the first liquid discharging head and the second liquid discharging head in the same direction such that the first liquid discharging orifice row and the second liquid discharging orifice row are positioned in the same direction, and position adjusting means for adjusting a relative position of the first liquid discharging head and the second liquid discharging head by moving at least one of the first liquid discharging head and the second liquid discharging head in the direction of the liquid discharging orifice rows; scanning means for scanning the head unit and the substrate relatively; and control means for controlling such that liquid is discharged from the first and second liquid discharging heads of the head unit during the relative scanning by the scanning means so as to form a display portion on the substrate, wherein the position adjusting means effects adjusting before discharging of the liquid such that a spacing between a first liquid discharging orifice of the first liquid discharging head and a first liquid discharging orifice of the second liquid discharging head is N times (wherein N is a natural number) the pitch of the liquid discharging orifices of the first liquid discharging head.

According to a fourth aspect of the present invention, a manufacturing method for manufacturing panels for a display device comprising a plurality of display units, wherein a head unit comprising a plurality of liquid discharging heads and a substrate are scanned relatively while applying liquid to pixel areas on the substrate from the liquid discharging heads, comprises: an adjusting step for adjusting a head unit comprising a first liquid discharging head comprising a first liquid discharging orifice row including multiple liquid discharging orifices, a second liquid discharging head comprising a second liquid discharging orifice row including multiple liquid discharging orifices, a head mounting unit for arraying the first liquid discharging head and the second liquid discharging head in the same direction such that the first liquid discharging orifice row and the second liquid discharging orifice row are positioned in the same direction, and position adjusting means for adjusting a relative position of the first liquid discharging head and the second liquid discharging head by moving at least one of the first liquid discharging head and the second liquid discharging head in the direction of the liquid discharging orifice rows; a scanning step for scanning the head unit and the substrate relatively; and a forming step for forming the display portion on the substrate by discharging liquid from the first and second liquid discharging heads of the head unit during the relative scanning, wherein the adjusting step is effected with the position adjusting means before the forming step, such that a spacing between a first liquid discharging orifice of the first liquid discharging head and a first liquid discharging orifice of the second liquid discharging head is N times (wherein N is a natural number) the pitch of the liquid discharging orifices of the first liquid discharging head.

Also, according to the present invention, a method for manufacturing a liquid crystal display device comprising a color filter manufactured by relatively scanning a head unit having a plurality of ink jet heads and a substrate while applying ink to the substrate from the ink jet heads, thereby coloring a filter element which functions as the color filter, comprises: a step for preparing a color filter manufactured by the manufacturing method according to the fourth aspect; and a step for sealing a liquid crystal compound between the prepared color filter and an opposing substrate facing the color filter.

Further, according to the present invention, a method for manufacturing an apparatus comprising a liquid crystal display device having a color filter manufactured by relatively scanning a head unit having a plurality of ink jet heads and a substrate while applying ink to the substrate from the ink jet heads, thereby coloring a filter element which functions as the color filter, comprises: a step for preparing a color filter manufactured by the manufacturing method according to the fourth aspect; a step for sealing a liquid crystal compound between the prepared color filter and an opposing substrate facing the color filter so as to manufacture the liquid crystal display device; and a step for connecting to the liquid crystal display device image signal supplying means for supplying image signals to the liquid crystal display device.

Further objects, features and advantages of the present invention will become apparent from the following description of the preferred embodiments with reference to the attached drawings.

BRIEF DESCRIPTION OF THE DRAWINGS

FIGS. 12A and 12B are diagrams illustrating examples of color patterns which can be manufactured with the present invention;

DESCRIPTION OF THE PREFERRED EMBODIMENTS

The preferred embodiments of the present invention will now be described with reference to the attached drawings. Note that in the present invention, the term "display device panel" or "panel for display device" is defined as an article having a display portion used for display. More specifically, the terms refer to a color filter having a colored portion or an EL display device having a light emitting portion formed of material which emits light of itself, or the like, used for a display device. In the case of a color filter, the colored portion is equivalent to the above-described display portion, and in the case of an EL display device, the light-emitting portion is equivalent to the above-described display portion.

Also, with the present invention, the term "color filter" is defined as comprising a colored portion and a base, and having capabilities to obtain output light with changed properties as to input light. A specific example is to obtain light of the three primary colors or R, G, B or C, M, Y from a back-light by transmitting light from the back-light with the liquid crystal display device.

(First Embodiment)

The following is a detailed description of a first preferred embodiment of the present invention with reference to the drawings. The present embodiment is a description of a case of manufacturing a color filter, as an example of a display device panel.

<Manufacturing Step for Color Filter: ① Acceptor Layer Type>

FIGS. 1A through 1F are diagrams for describing an example of the manufacturing method of the color filter according to the present embodiment. Though the present embodiment uses a glass substrate as the substrate 1, this is by no means restricted to a glass substrate so long as the article has necessary properties to serve as a liquid crystal filter, such as transparency, mechanical strength, and so forth. For example, a plastic plate may be used suitably, as well.

Figure 1A:
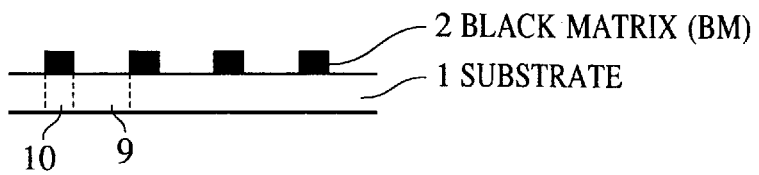
FIGS. 1A through 1F are diagrams illustrating an example of the manufacturing process of a color filter.
Figure 1B:
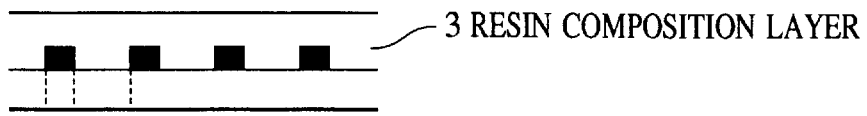
Figure 1C:
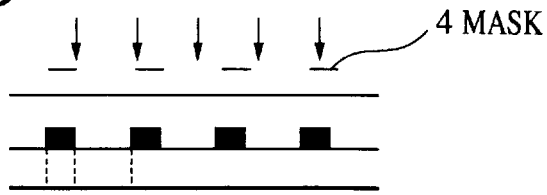

FIG. 1A illustrates a glass substrate 1 comprising a light transmitting portion 9, and a black matrix (BM) 2 defining a light shading portion 10. First, a resin composition is applied to the substrate 1 upon which the black matrix 2 serving as a shielding portion has been formed, this resin composition having poor ink accepting properties but becoming "ink-philic" under certain conditions (e.g., irradiation of light, or irradiation of light and application of heat) and having properties such as hardening under certain conditions. Pre-baking is performed as necessary, thereby forming a resin composition layer 3 (FIG. 1B). Note that this resin composition layer 3 may be formed by applying methods such as spin coating, roll coating, bar coating, spray coating, dip coating, etc., and is not restricted to any in particular.

Figure 1D:
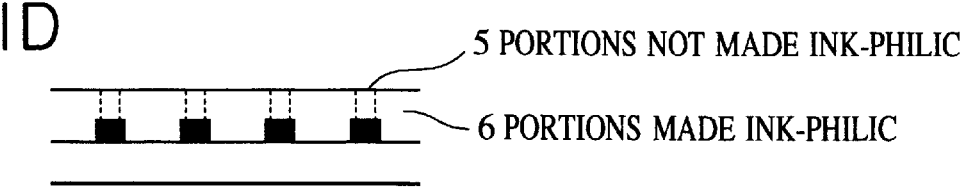
Figure 1E:
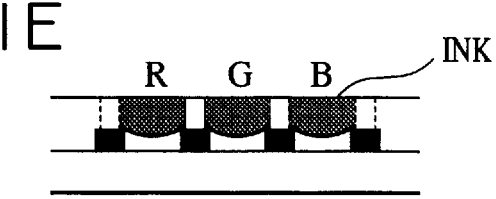

Next, a photo-mask 4 is used to perform pattern exposing on the resin layer upon the light-transmitting portion 9, so as to make the unmasked resin layer portion ink-philic (FIG. 1C), thereby forming a portion 6 that is ink-philic (i.e., the exposed portion) and a portion 5 that is not ink-philic (i.e., the masked portion) on the resin composition layer 3 (FIG. 1D).

Subsequently, ink of the colors R (red), G (green), and B (blue) are discharged from the ink jet heads toward the resin composition layer 3 so as to color the portion 6 made to be ink-philic (FIG. 1E), and further the ink is dried as necessary. The portion colored by each of the colors R, G, and B is referred to as a filter element (pixel), and the filter element is the part which functions as a color filter. Also, both thermal energy and mechanical energy are suitably used as types of ink jet methods. The ink used is not restricted in particular so long as it can be discharged from ink jet heads, and coloring agents matching the required transmittance spectrum for each of the R, G, and B pixels are selected from various dyes and pigments as appropriate for the ink.

Figure 1F:
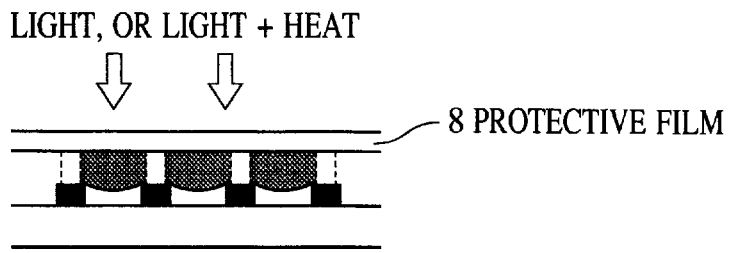

Next, light irradiation, or heat application and light irradiation is performed, so as to harden the colored resin composition layer 3, and a protective layer 8 is formed on the surface thereof as necessary (FIG. 1F). Methods which can be applied consist of applying conditions different from the conditions for the above-described processing for making it ink-philic (FIG. 1C), such as greatly changing the amount of exposure light for the light irradiation, changing the heating conditions, using both light irradiation and heat application, and so forth.

Next, a manufacturing method which is applicable to the present invention and differs from the above color filter manufacturing method, is shown in FIGS. 2A through 2F. In FIGS. 2A through 2F, the items which are denoted by the same reference numerals as those in FIGS. 1A through 1F are the same members.

Figure 2A:
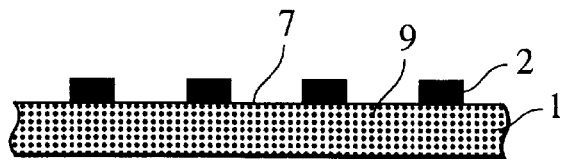
FIGS. 2A through 2F are diagrams illustrating another example of the manufacturing process of a color filter.
Figure 2B:
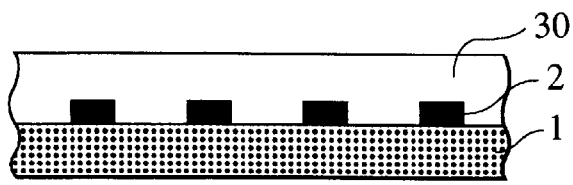
Figure 2C:
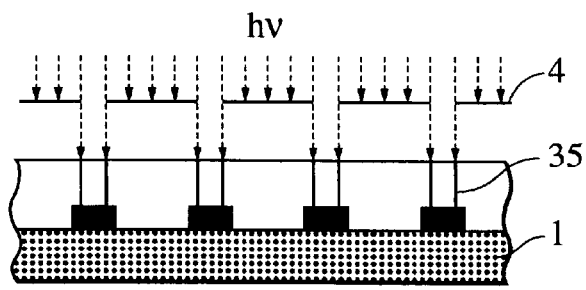
Figure 2D:
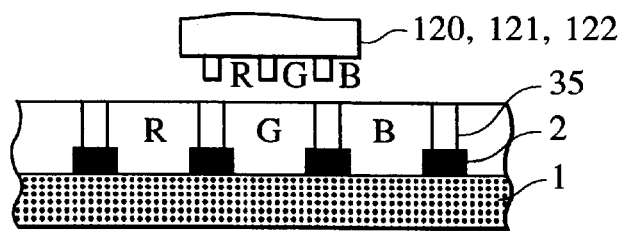
Figure 2E:
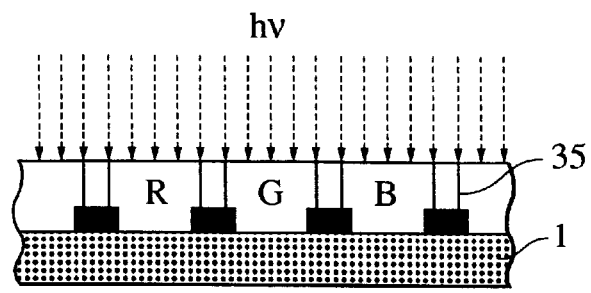

FIG. 2A shows a glass substrate 1 having a light transmitting portion 9 and a black matrix 2 defining a shielding portion. First, a resin composition which can be hardened by light irradiation or light irradiation and heat application and which accepts ink is applied onto the substrate 1 upon which the black matrix 2 has been formed, and pre-baked if necessary, thereby forming a resin layer 30 (FIG. 2B). This resin layer 30 may be formed by applying methods such as spin coating, roll coating, bar coating, spray coating, dip coating, etc., and is not restricted to any in particular.

Next, the portion of resin layer 30 shielded by the black matrix 2 is subjected to pattern exposing beforehand using a photo-mask 4, so as to harden a part of the resin layer 30 and form a part 35 which does not absorb ink (non-coloring part) (FIG. 2C), following which the ink jet head 120 is used to color the colors R, G, and B all at once (FIG. 2D), and the ink is dried as necessary.

For the photo-mask 4 used for the patterning exposure here, an item having openings for hardening the shielded parts by the black matrix 2 is used. At this time, a relatively great amount of ink needs to be applied, to prevent discoloration of the coloring agent at parts adjacent to the black matrix 2. For this reason, a mask 4 with openings narrower than the (shielding) width of the black matrix 2 is preferably used. Both coloring matters and pigments may be used for the ink used for coloring, and both liquid ink and solid ink can be used.

As for the resin composition capable of being hardened which is used with the present embodiment, any type can be used so long as the resin composition accepts ink, and can be hardened by either light irradiation or light irradiation and heat application. Examples of such resin include, e.g., acrylic resins, epoxy resins, silicon resins, hydroxy propyl cellulose, hydroxy ethyl cellulose, methyl cellulose, carboxy methyl cellulose, other such cellulose derivatives, or denaturants thereof.

Photo-initiators (cross-linking agents) may be used for accelerating the cross-linking reaction of the resins by light or light and heat. Examples of photo-initiators which can be used include bichromate, bis-azide compounds, initiators of radicals, cationic initiators, anionic initiators, and so forth. Or, these photo-initiators may be mixed, or combined with other sensitizers. Further, photooxidizing agents such as salts of oniums may be used as cross-linking agents. Moreover, heating processing may be performed following the light irradiation, to further accelerate the cross-linking reaction.

The resin layer containing these compositions has extremely excellent heat and water withstanding properties, and can sufficiently withstand both the high heat in the following steps and also the washing step.

As for the ink jet method used with the present invention, the bubble-jet type wherein electro-thermal converters are used as energy generating devices, or the piezo-jet type wherein piezoelectric devices are used, can be applied, and the coloring area and coloring pattern can be set arbitrarily.

Also, the present example shows an arrangement wherein a black matrix 2 is formed on the substrate, but there is no particular problem even in the event that the black matrix is formed over the resin layer following forming the resin composition layer which can be hardened or following coloring, and the form thereof is not restricted to that in the present example. Also, the black matrix is preferably formed by forming a metal thin film on the substrate 1 by sputtering or by vapor deposition, which is patterned by photolithography, but the method for forming the black matrix is not restricted to this.

Figure 2F:
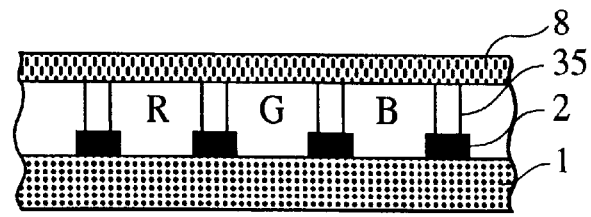

Next, light irradiation alone, heat application alone, or both light irradiation and heat application is performed so as to harden the resin composition layer that can be hardened (FIG. 2E), and a protective layer 8 is formed if necessary (FIG. 2F). Also, the protective layer 8 may be formed of a second resin composition of a light hardening type, heat hardening type, or light irradiation and heat application type, or may be formed of an inorganic material using vapor deposition or sputtering, and any material may be used as long as the material has transparency in the event of forming into a color filter, and can sufficiently withstand the subsequent ITO forming process, oriented film forming process, and so forth.

Now, with the above-described examples according to FIGS. 1A through 1F and 2A through 2F, arrangements wherein the resin composition layer 30 for accepting ink is formed on the glass substrate have been described, but the present invention is not restricted to this; rather, ink may be applied directly onto the glass substrate 1 to form the filter elements (pixels). This will be described below with reference to FIGS. 3A through 3D.

<Manufacturing Step for Color Filter: ② Acceptor Layerless Type>

Next, a manufacturing method, which is applicable with the present invention and differs from the above color filter manufacturing method, is illustrated in FIGS. 3A through 3D. In FIGS. 3A through 3D, the items which are denoted by the same reference numerals as those in FIGS. 1A through 1F are the same members as those shown in FIGS. 1A through 1F.

Figure 3A:
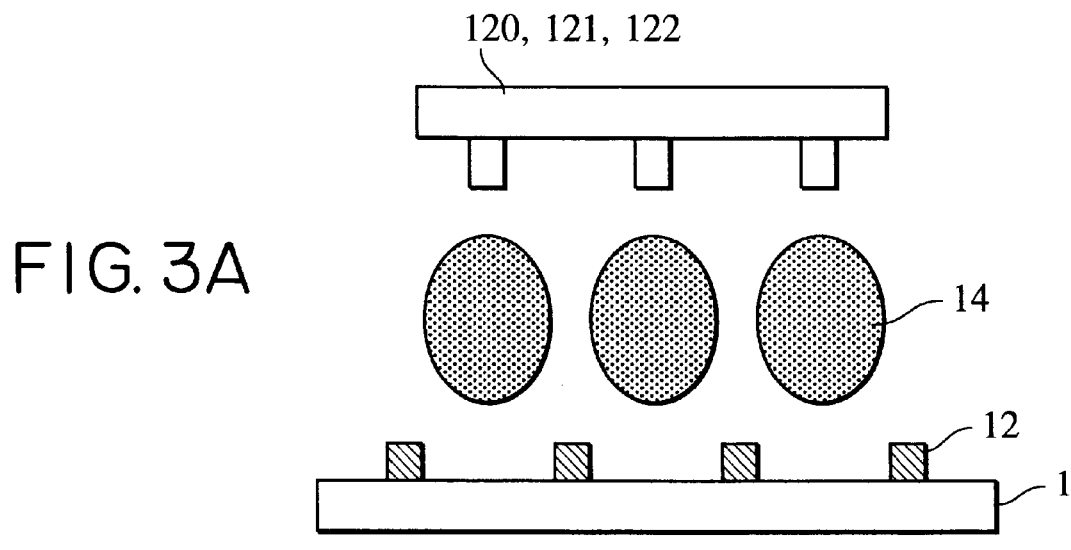
FIGS. 3A through 3D are diagrams illustrating another example of the manufacturing process of a color filter.
Figure 3B:
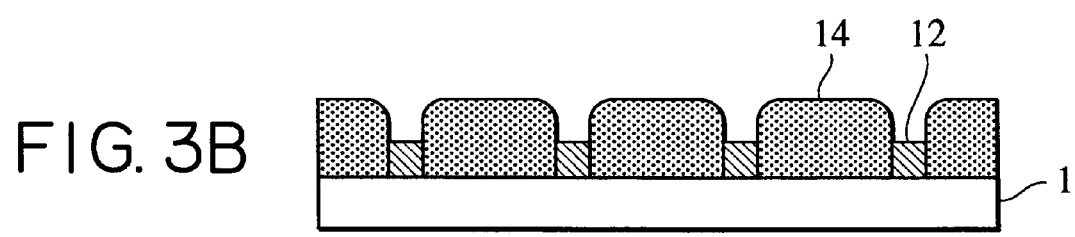

FIG. 3A illustrates the step of forming partitions 12 having ink-repelling properties on the light-transmitting substrate 1, and applying hardening ink 14 from ink jet heads (120, 121, and 122). With the present invention, the partitions 12 define recesses for receiving the hardening ink 14, and are also provided for preventing different color inks from mixing between adjacent color filter elements. The partitions 12 can be easily formed by patterning photosensitive photoresist, for example, but the partitions can also serve as the black matrix or black stripes, and in this case patterning black resist is sufficient.

In the present invention, the partitions 12 may be formed directly upon the light transmitting substrate 1, or instead may be formed on a substrate upon which are formed layers having other functions, such as an active matrix substrate upon which a TFT array is formed, for example, as necessary. In either case, some sort of surface processing may be effected on the surface of the face on which the color filters are formed, in order to increase the dispersion of the hardening ink.

The hardening ink 14 used with the present invention is an ink which hardens due to light irradiation, heat application, or both. Both liquid inks and solid inks can be used for the hardening ink 14, and also both pigments and dyes can be used. The ink 14 contains resin components which harden from the light irradiation, heat application, or both, coloring material, organic solvents, and water.

Commercially-available resins or hardening agents can be used for the hardening component, and specific examples suitably used include acrylic resins, epoxy resins, melamine resins, and the like.

Figure 3C:
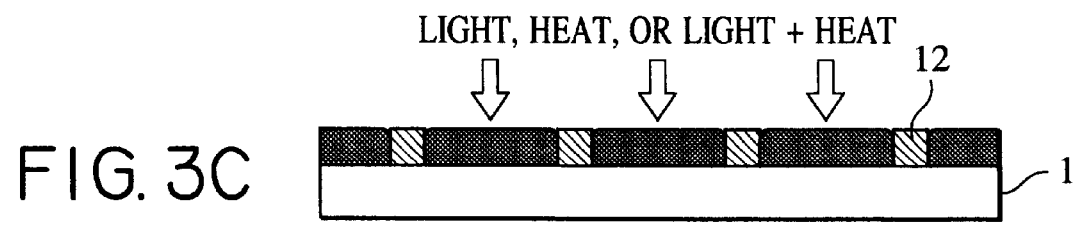
Figure 3D:
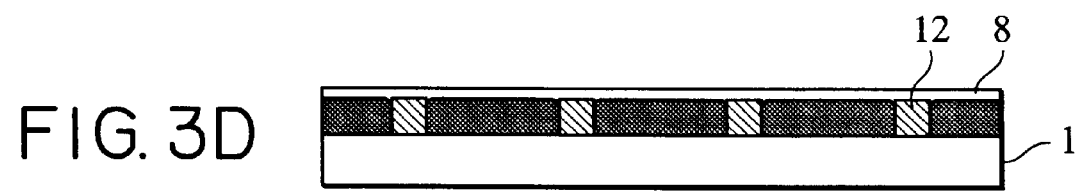

Following applying the hardening ink 14 to the filter elements (FIG. 3B), drying processing is performed as necessary, and the ink is hardened by light irradiation, heat application, or both, thereby forming the color filters (FIG. 3C). Subsequently, a protective layer 8 is formed, if necessary (FIG. 3D).

[Description of Color Filters]

Figure 10:
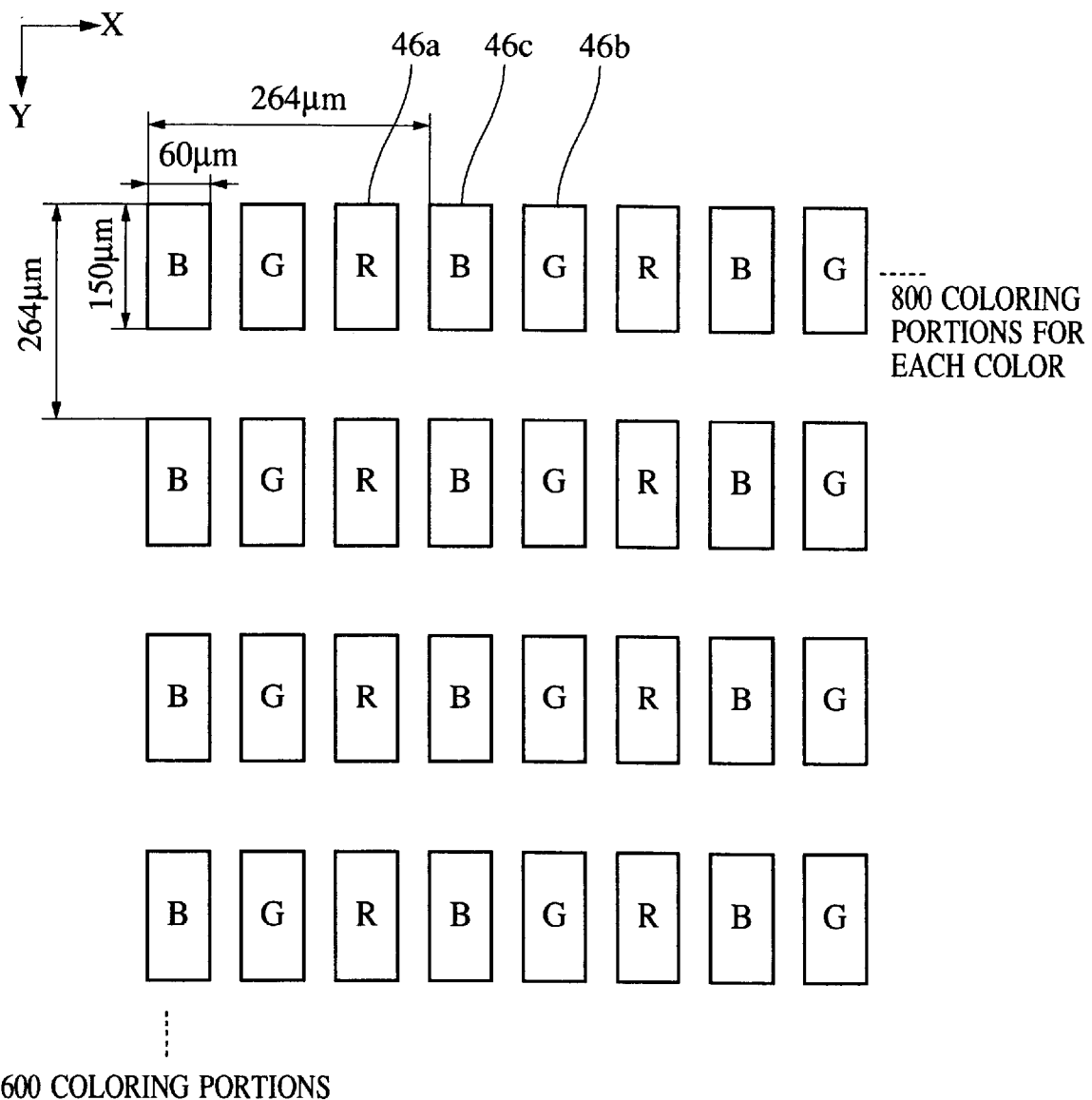
FIG. 10 is a diagram illustrating an example of a pattern for a color filter which can be manufactured with the present invention.
Figure 11:
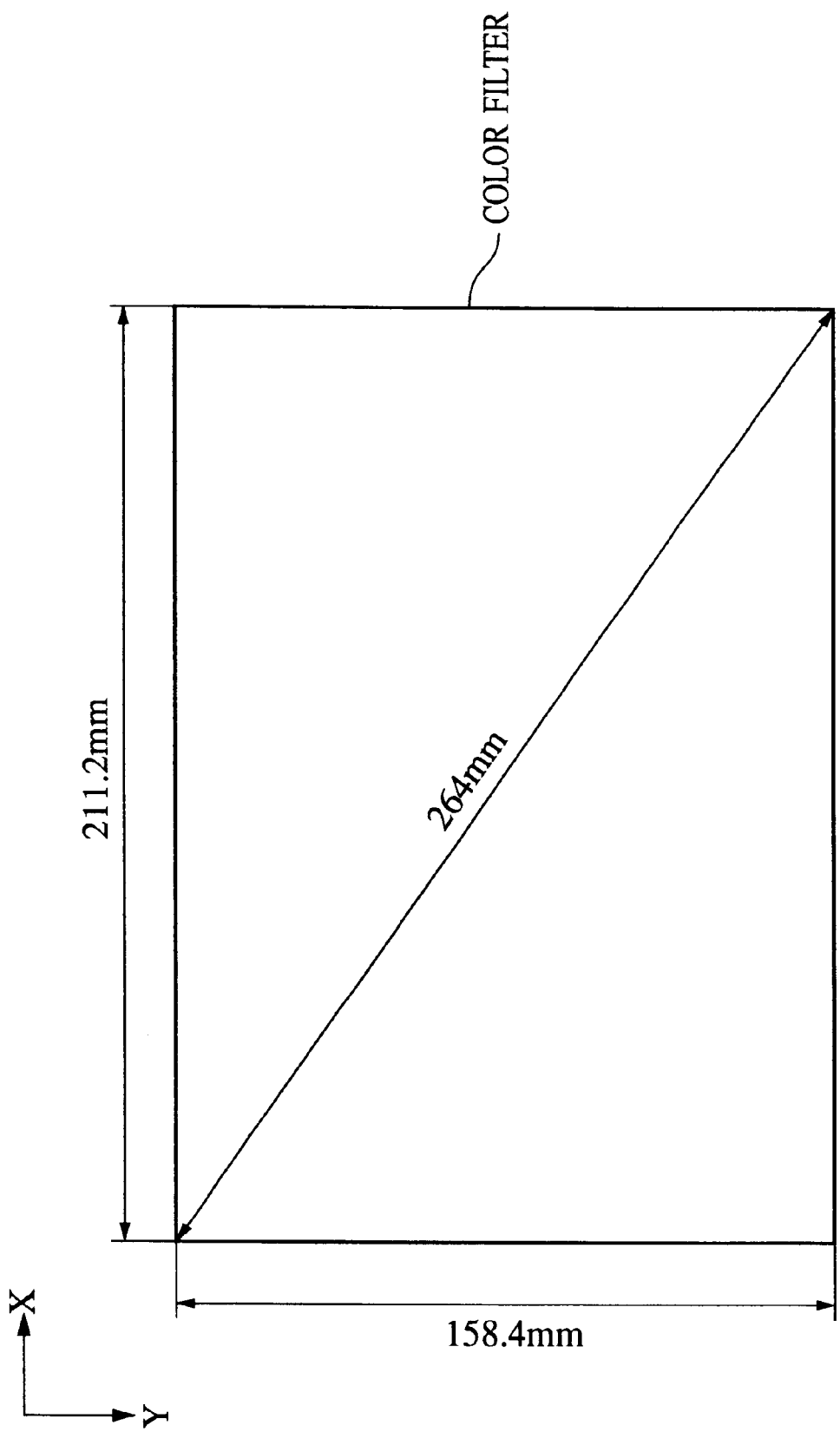
FIG. 11 is a diagram illustrating the size of the display portion (i.e., image size) upon the color filter manufactured according to the present invention being assembled into a TFT liquid crystal panel.

Next, FIG. 10 shows the color pattern of the color filters manufactured according to the present invention. Generally rectangular colored portions are colored by inks of the colors R (red), G (green), and B (blue) to form multiple filter elements (pixels). The size of one colored portion 46 (46a, 46b, 46c) is 150 $\mu$m in the Y direction and 60 $\mu$m in the X direction. Note that the longitudinal direction of the colored portions is the Y direction thereof, and the direction orthogonal to this Y direction is the X direction. Also, adjacent colored portions are colored with the same color in the Y direction, and colored with different colors in the X direction. The pixel pitch is 264 $\mu$m in both X and Y directions. The number of pixels is 800 in the X direction and 600 in the Y direction, with the color filter size (screen size) being 211.2 mm×158.4 mm as shown in FIG. 11, with the length of the diagonal line corresponding to that of a 10.4 inch SVGA liquid crystal panel of 264.0 mm. Here, the size of the color filter means the size of the display portion at the time of the color filters being assembled to the TFT liquid crystal panel.

Of course, the color filters which can be manufactured according to the present embodiment are by no means restricted to the number of pixels and screen size of the color filters shown in FIGS. 10 and 11. Examples of the number of pixels of color filters which can be manufactured include VGA (640×480), XGA (1024×768), SXGA (1280×1024), SXGA+ (1400×1050), UXGA (1600×1200), QXGA (2048× 1536), etc., and examples of screen size include 12.1 inch, 13.3 inch, 14.1 inch, 15.0 inch, 17.0 inch, 18.0 inch, 20.0 inch, and so forth.

Also, with regard to the color pattern (pixel pattern array), the present invention is not restricted to the stripe type shown in FIG. 10; rather various color patterns (e.g., mosaic, delta, etc.) such as those shown in FIG. 12 can be manufactured with the present embodiment.

[Color Liquid Crystal Display Device with Color Filters Incorporated]

Figure 4:
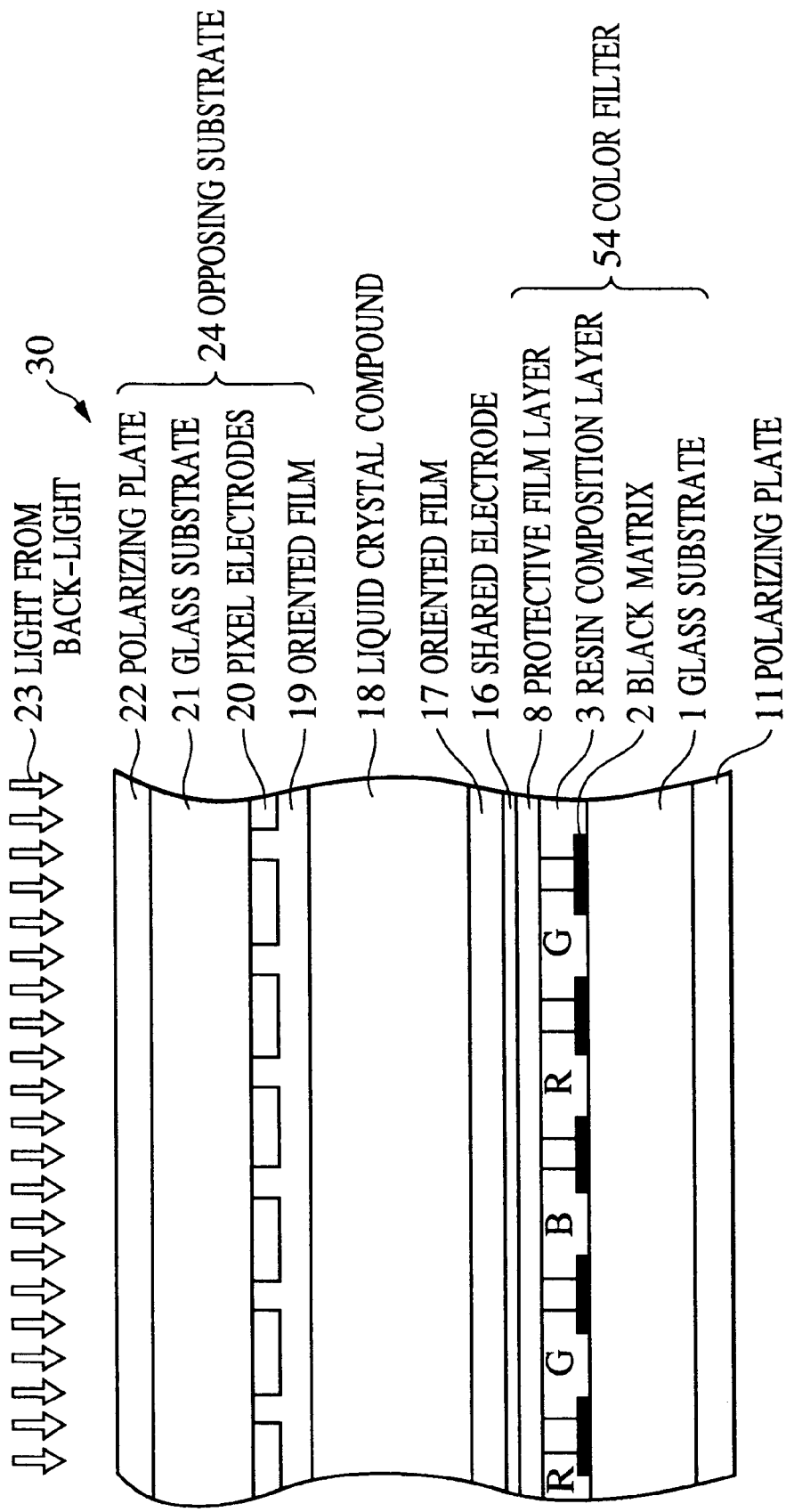
FIG. 4 is a cross-sectional view of one example of a basic configuration of a color liquid crystal display device into which the color filter according to an embodiment has been incorporated.
Figure 5:
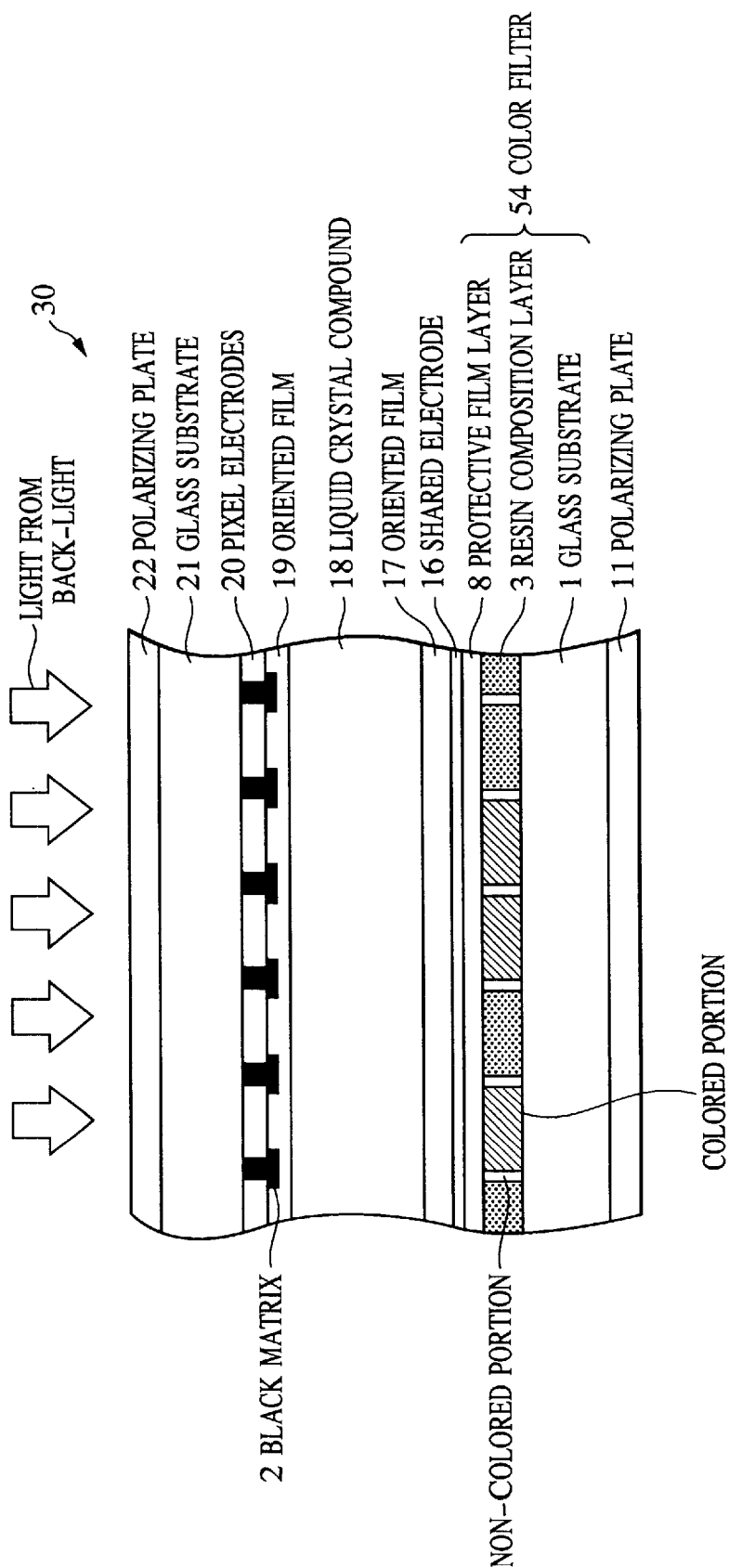
FIG. 5 is a cross-sectional view of another example of a basic configuration of a color liquid crystal display device into which the color filter according to an embodiment has been incorporated.
Figure 6:
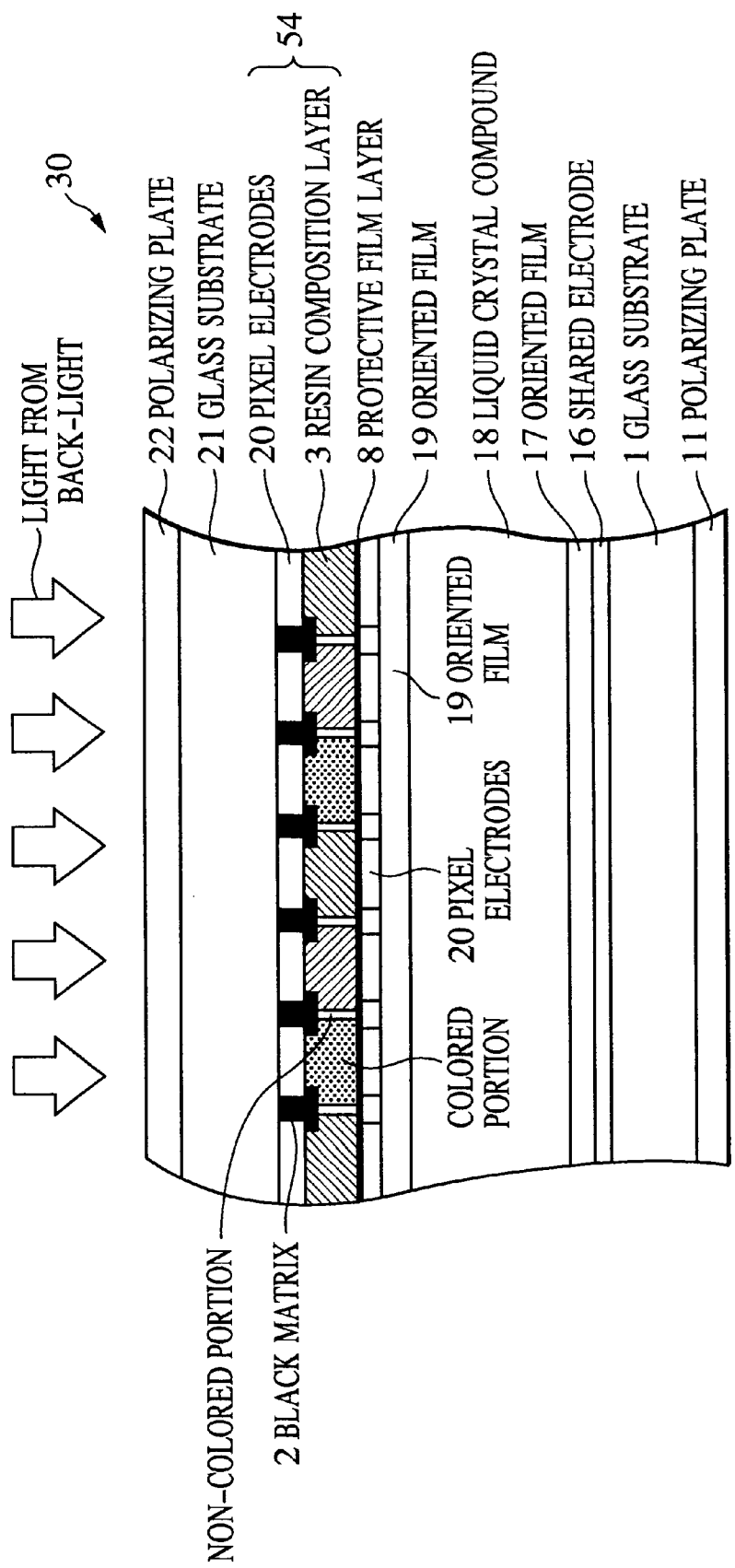
FIG. 6 is a cross-sectional view of another example of a basic configuration of a color liquid crystal display device into which the color filter according to an embodiment has been incorporated.

Next, description will be made regarding a liquid crystal display device manufactured by using the color filters formed according to the present embodiment. FIGS. 4 through 6 are cross-sectional views illustrating the basic configuration of the display screen of the color liquid crystal display device 30 with the color filters incorporated therein.

Reference numeral 11 denotes a polarizing plate, 1 denotes a transparent substrate of glass or the like, 2 denotes a black matrix, 3 denotes a resin composition layer (ink accepting layer), 8 denotes a protective layer, 16 denotes a shared electrode, 17 denotes an oriented film, 18 denotes a liquid crystal compound, 19 denotes an oriented film, 20 denotes pixel electrodes, 21 denotes a glass substrate, 22 denotes a polarizing plate, and 23 denotes light from a back-light. Reference numeral 54 denotes the components forming the color filter, and 24 denotes components forming an opposing plate. Here, description will be made with reference to a case of using color filters obtained by the manufacturing method shown in FIGS. 1A through 1F, but it is needless to say that color filters manufactured by the methods shown in FIGS. 2A through 2F or FIGS. 3A through 3D may be used as well.

The color liquid crystal display device 30 according to the present embodiment is formed by placing the color filter 54 and the opposing substrate 24 together, and sealing therebetween a liquid crystal compound 8. TFTs (not shown) and transparent electrodes 20 are formed in matrix fashion on the inner side of one substrate 21 of the liquid crystal display device. Also, the color filter 54 having color material arrays of R, G, B, at positions facing the pixel electrodes is formed on the inner side of the other substrate 1, and a transparent opposing electrode 16 is formed over the entire surface thereof. The black matrix 2 is normally formed on the color filter substrate 1 side (see FIG. 4), but can be formed on the opposing TFT substrate side with black matrix on-array type liquid crystal panels (see FIG. 5). Further, an oriented film 19 is formed at the inner side of both substrates, and subjecting this to rubbing processing allows the liquid crystal molecules to be arrayed in a constant direction. Also, polarizing plates 11 and 22 are adhered to the outer side of each of the glass substrates, and the liquid crystal compound 18 is filled in the gap (around 2 to 5 μm) between the glass substrates 1 and 21. Also, a combination of a fluorescent lamp and a scattering plate is commonly used as the back-light, and display is made by causing the liquid crystal compound to act as an optical shutter for changing the transmittance of the light from the back-light.

Also, colored portions (filter elements) making up the color filter are not restricted to being formed on a glass substrate, and colored portions (filter elements) may be formed on pixel electrodes 20 as shown in FIG. 6.

Description will be made regarding an example wherein such a liquid crystal display device is applied to an information processing device, with reference to FIGS. 7 through 9.

Figure 7:
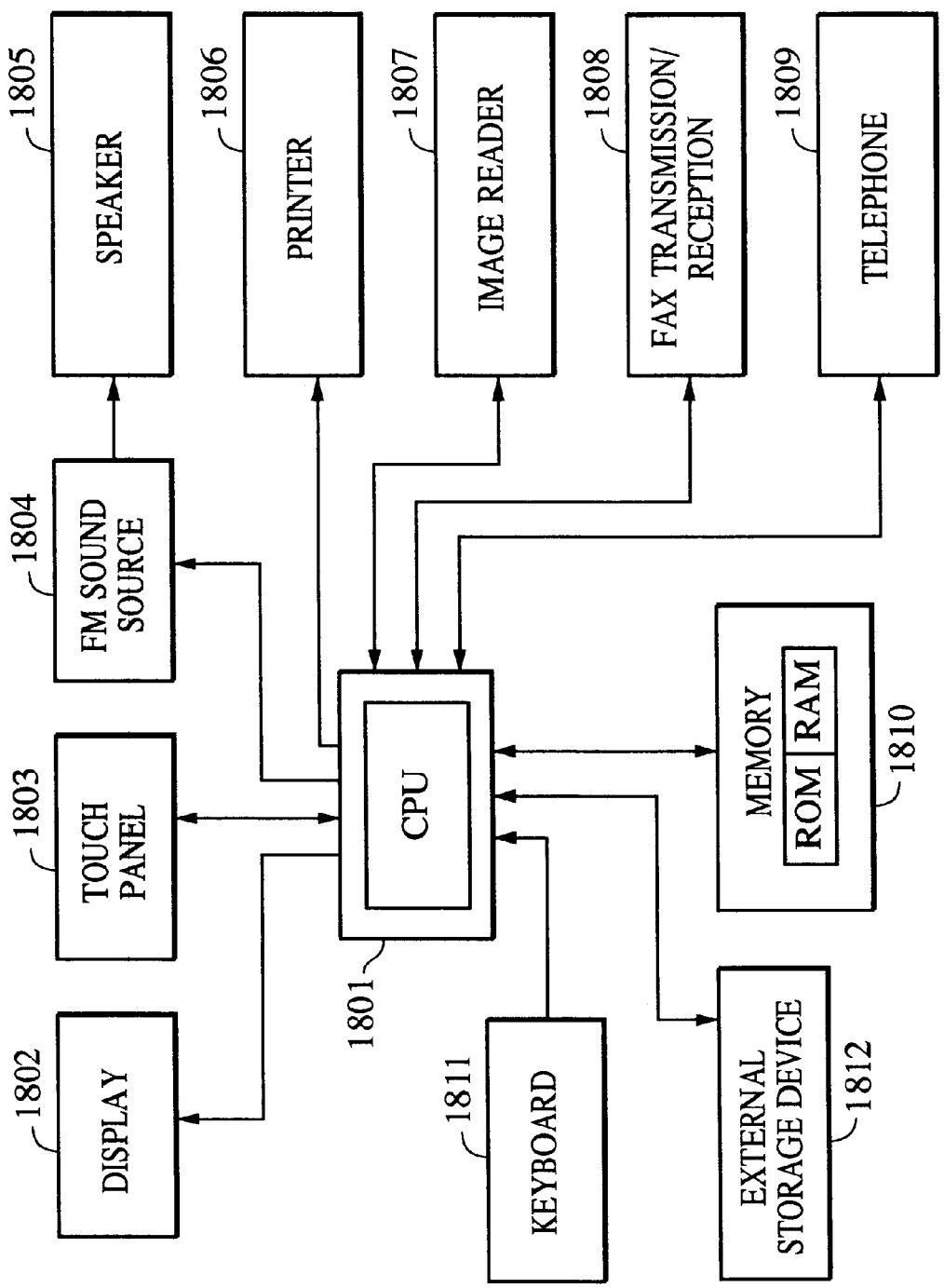
FIG. 7 is a block diagram illustrating a schematic configuration of an arrangement wherein a liquid crystal display device is applied to an information processing device.

FIG. 7 is a block diagram illustrating the schematic configuration in the event that the above liquid crystal display device is applied in an information processing device having functions as a word processor, personal computer, facsimile device, and photocopier.

In the Figures, reference numeral 1801 denotes a control unit for performing control of the overall device, having a CPU such as a microprocessor and various I/O ports, so as to perform control by inputting and outputting control signals and data signals to and from each unit. Reference numeral 1802 denotes a display, with various types of menus and document information, and image data read by image reader 1807 and so forth being displayed on the display screen. Reference numeral 1803 denotes a transparent pressure-sensitive touch panel, arranged such that input of items, coordinates, etc., can be made on the display 1802 by pressing the surface thereof with fingers or the like.

Reference numeral 1804 denotes an FM (Frequency Modulation) sound source, where music information created with a music editor or the like is stored in memory 1810 or an external storing device 1812 as digital data and read out from the memory or the like to be subjected to FM modulation. Electric signals from the FM sound source 1804 are converted into audible sound by a speaker 1805. The printer 1806 is used as an output terminal for the word processor, personal computer, facsimile device, and photocopier.

Reference numeral 1807 denotes an image reader which photo-electrically reads and inputs original document data, provided along the transporting path for original documents, where various types of document reading are performed, such as for facsimile originals or photocopier originals.

Reference numeral 1808 is a transmitting/receiving unit for a facsimile (FAX) which receives and decodes facsimile transmission of original document data read with the image reader 1807 and facsimile signals being sent thereto, and also has external interfacing functions. Reference numeral 1809 is a telephone device having various telephone functions such as normal telephone functions, message recorder functions, and so forth.

Reference numeral 1810 is a memory such as a ROM for storing system programs, manager programs, and other application programs and the like, and character fonts and dictionaries and the like, application programs and document information loaded from the external storage device 1812, and further video RAM and the like. Reference numeral 1811 is a keyboard for inputting document information and various commands and the like. Reference numeral 1812 is the external storage device having a floppy disk or hard disk or the like as the recording medium thereof, and the external storage device 1812 stores document information, music or audio information, user application programs, and so forth.

Figure 8:
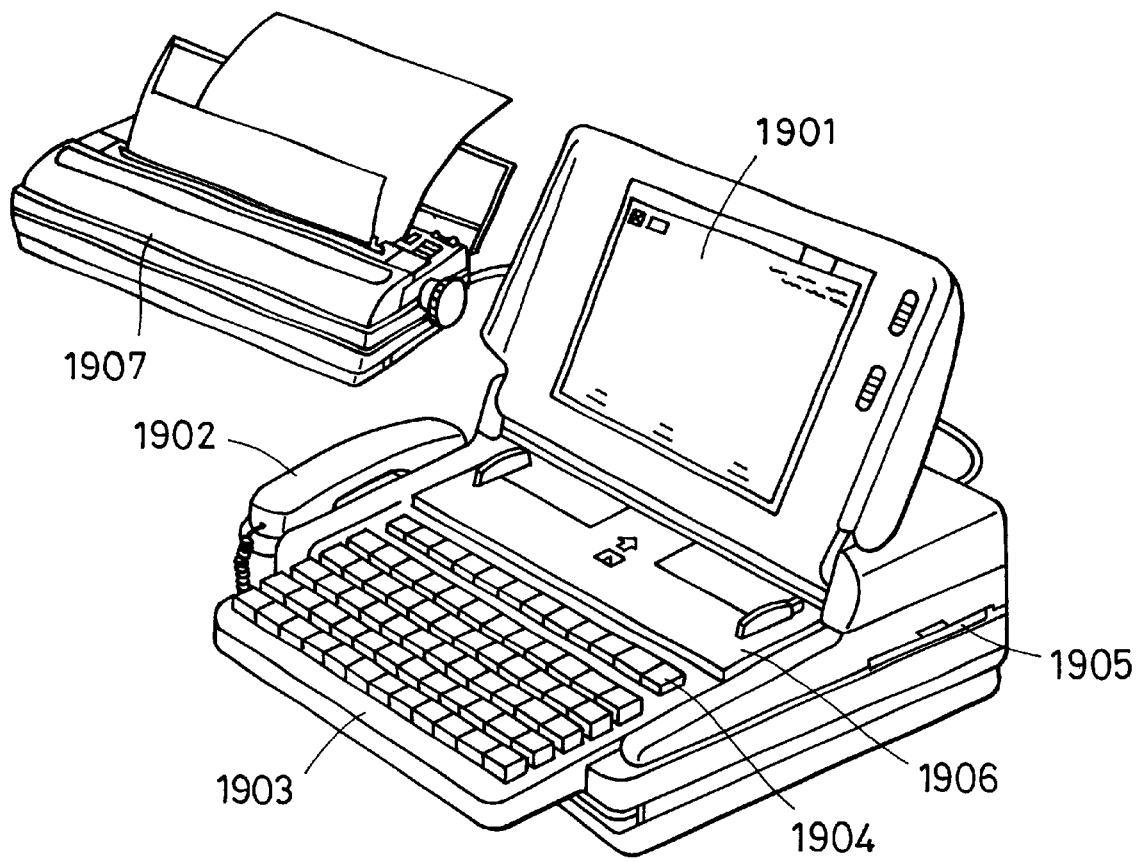
FIG. 8 is a diagram illustrating an information processing device with which the liquid crystal display device is used.

FIG. 8 is a schematic diagram of the information processing device shown in FIG. 7.

In the figure, reference numeral 1901 denotes a flat panel display using the above-described liquid crystal display device, which displays various types of menus, shape information, document information, and so forth. Coordinates and items to be specified can be input with the display 1901 by pressing the surface of the touch panel 1803 with the finger or the like. Reference numeral 1902 is a handset used in the event that the device is serving as a telephone device. A keyboard 1903 is detachably connected to the main unit by a cord, allowing input of various types of data and document functions. Also, the keyboard 1903 has various function keys 1904 and the like. Reference numeral 1905 is an insertion slot for floppy disks, which is one of the external storage devices 1812.

Reference numeral 1906 is a sheet table portion for receiving the original document to be read by the image reader 1807, and the read original is ejected from the rear of the device. Also, at the time of receiving facsimiles or the like, the received information is printed by the ink jet printer 1907.

In the event that the above-described information processing device is to function as a personal computer or word processor, various types of information input from the keyboard 1903 are processed by predetermined programs by the control unit 1801, and are output as images from the printer 1907.

Also, in the event that the above-described information processing device is to function as a facsimile receiver, facsimile information input from the facsimile transmitting/receiving unit 1808 via the communication line is received and processed according to predetermined programs by the control unit 1801, and are output as received images from the printer 1907.

Also, in the event that the above-described information processing device is to function as a photocopier, the original document is read by the image reader 1807, the read document data is sent from the control unit 1801 to the printer 1907, and output as a photocopier image. Incidentally, in the event of functioning as a facsimile receiver, the original document data read by the image reader 1807 is subjected to transmission processing according to predetermined programs by the control unit 1801, and transmitted to the communication line via the facsimile transmitting/receiving unit 1808.

Figure 9:
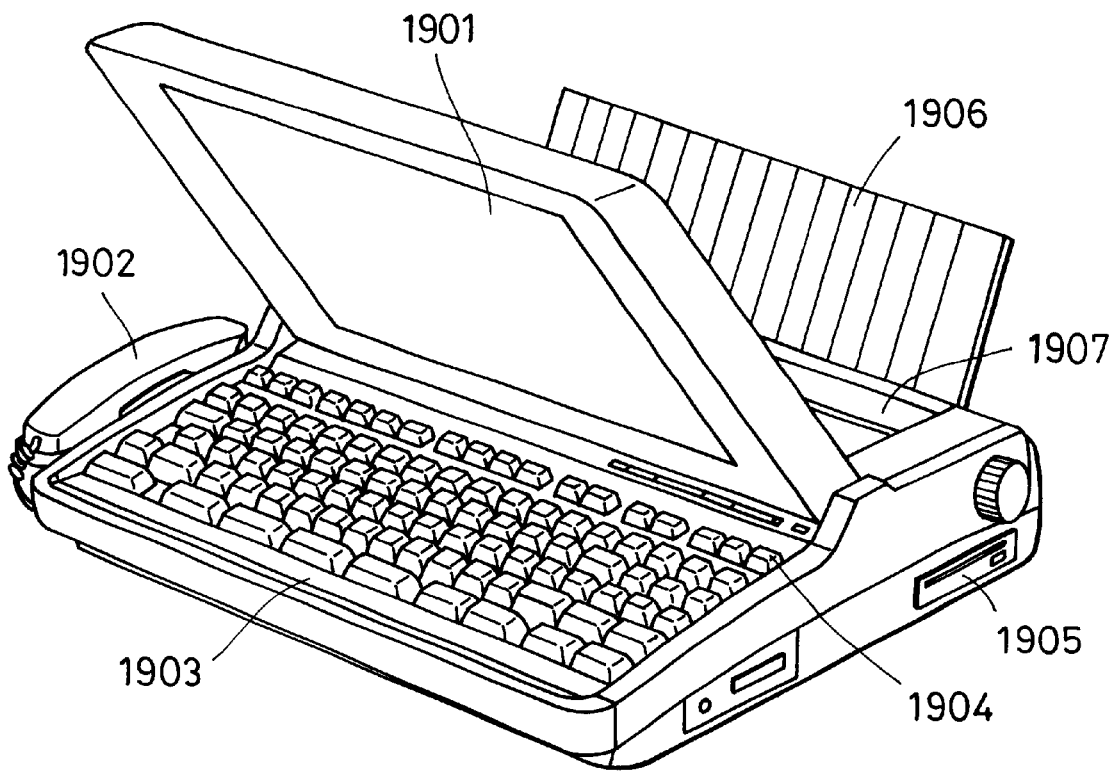
FIG. 9 is another diagram illustrating an information processing device with which the liquid crystal display device is used.

Now, the above-described information processing device may be of an integrated form wherein the ink-jet printer 1907 is built into a main unit, as shown in FIG. 9, an arrangement which increases portability. In the figure, parts having the functions that are the same as those in FIG. 8 are denoted with corresponding reference numerals, and description thereof is omitted.

<Description of Overall Configuration of the Color Filter Manufacturing Apparatus>

Figure 13:
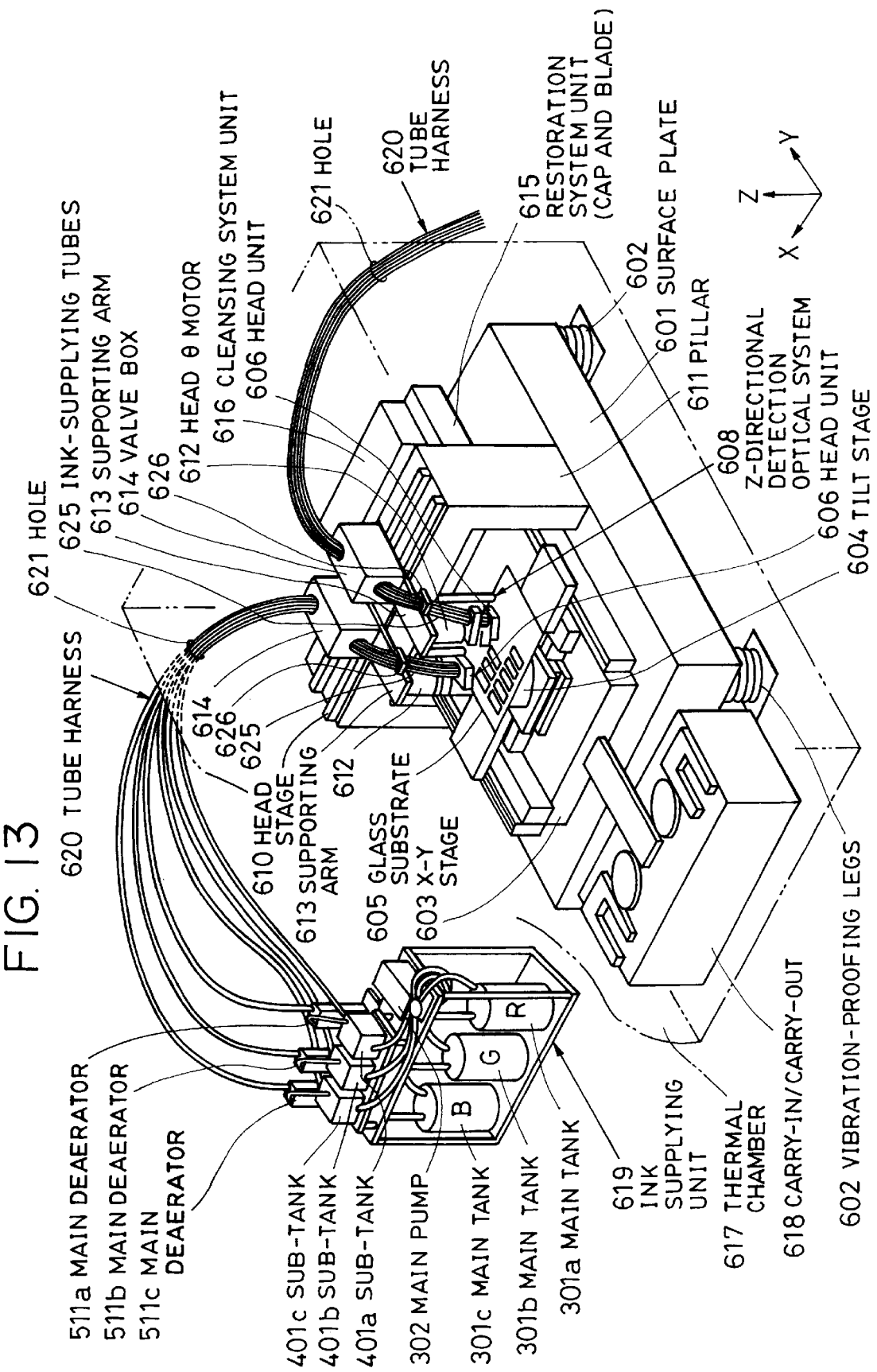
FIG. 13 is a schematic view (perspective view) illustrating a configuration of an embodiment of a color filter manufacturing apparatus.
Figure 14:
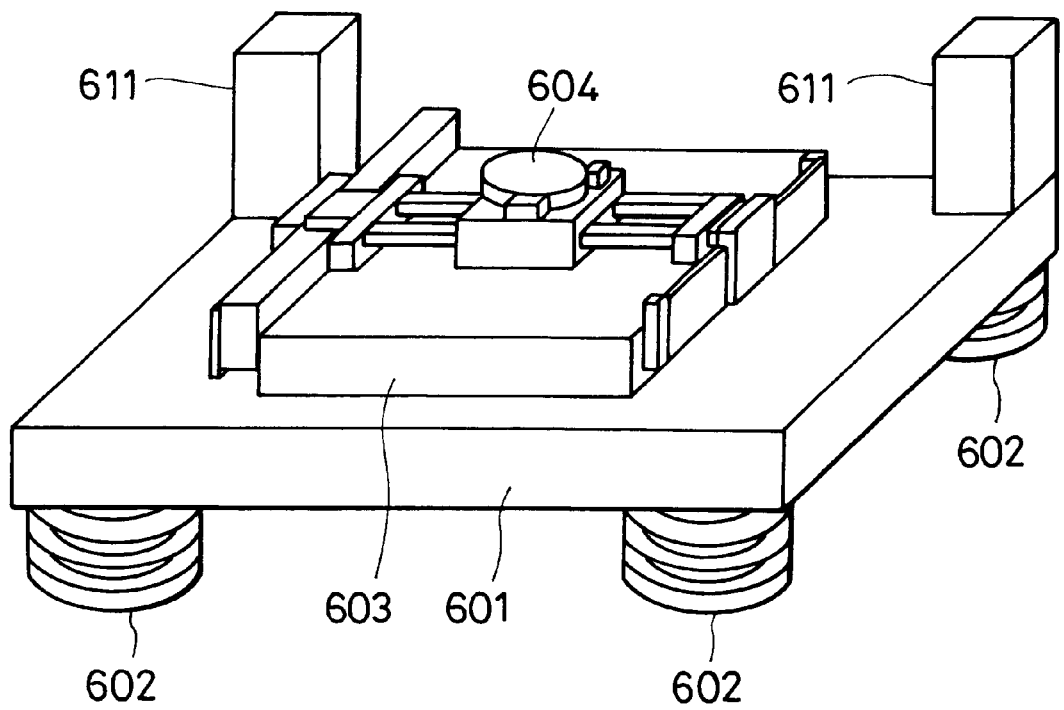
FIG. 14 is a detailed diagram of a section including the stage of the color filter manufacturing apparatus.
Figure 15:
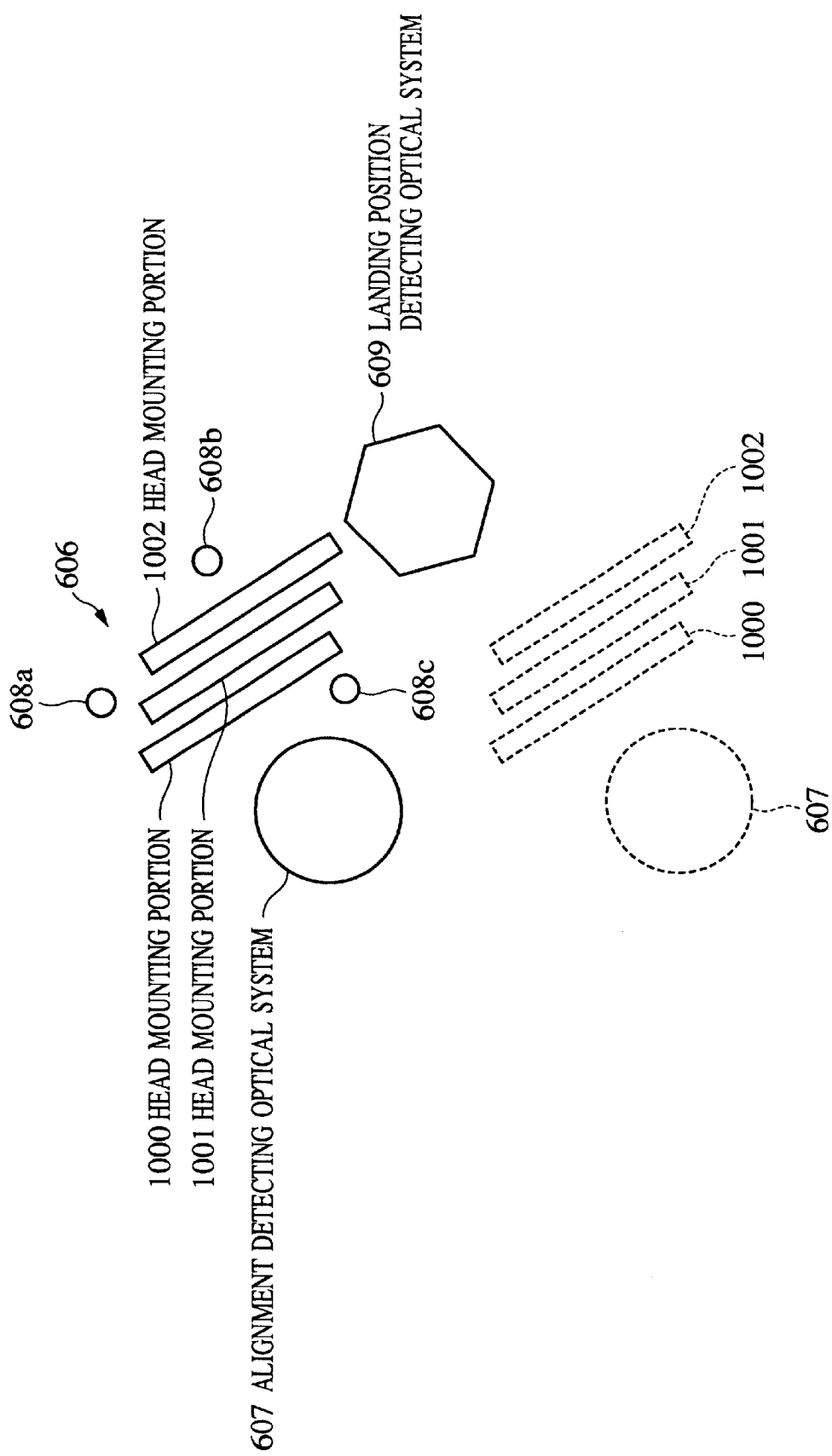
FIG. 15 is a positional diagram of the ink jet head and optical system of the color filter manufacturing apparatus.
Figure 16:
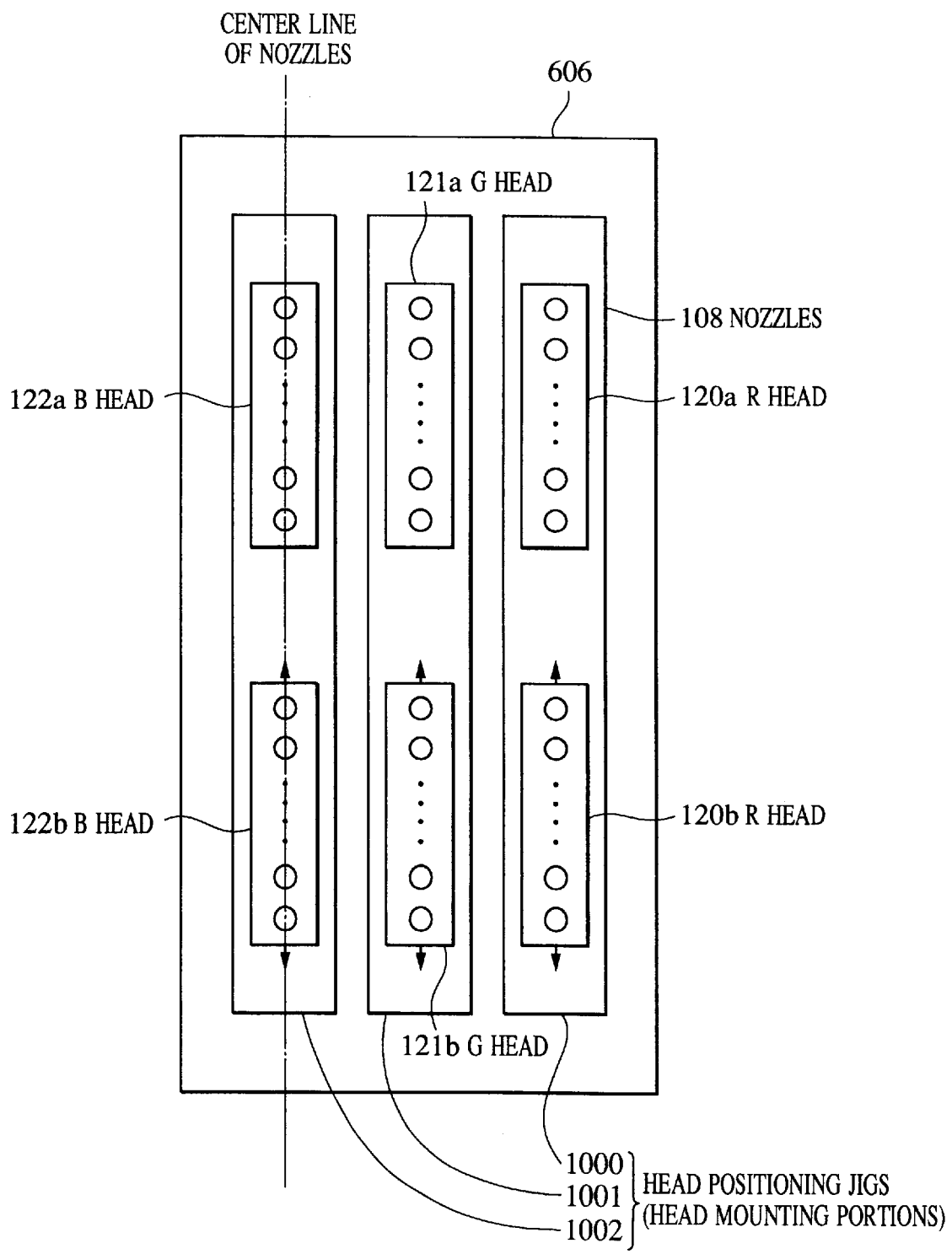
FIG. 16 is a schematic configuration diagram of the ink jet head unit.

FIGS. 13 through 16 are diagrams illustrating the configuration of a color filter manufacturing apparatus applicable to the present embodiment. FIG. 13 is a schematic diagram (perspective view) of the apparatus, FIG. 14 is a detailed diagram of a section including the stage of the apparatus, FIG. 15 is a placement diagram of the ink jet head and optical system of the apparatus, and FIG. 16 is an ink jet head unit (which may be referred to simply as "head unit") having two each of each color of R, G, and B.

In FIGS. 13 through 16, reference numeral 601 denotes a surface plate for mounting the apparatus thereon, 602 denotes vibration-proofing legs which support the surface plate 601 and isolate the apparatus from external vibrations, reference numeral 603 denotes an X-Y stage provided on the surface plate 601 and which performs large stroke movement, reference numeral 604 denotes a θ-Z tilt stage positioned on the X-Y stage for θ-Z tilt alignment positioning. Reference numeral 605 denotes a glass substrate which is placed on the θ-Z tilt stage 604 and which has a black matrix and resin composition layer formed thereupon by the already-described method, and reference numeral 606 denotes head units wherein two ink jet heads of each color of R, G, and B (120a, 120b, 121a, 121b, 122a, 122b) are relatively positioned by head positioning jigs (head mounting portions) 1000, 1001, and 1002. As shown more clearly in FIG. 15, reference numeral 607 denotes an X-Y-θ direction alignment detecting optical system for performing alignment in the X, Y, and θ directions for the glass substrate 605, reference numeral 608 (608a, 608b, and 608c) denotes a Z-directional detecting optical system for performing Z-directional detection, and reference numeral 609 denotes a landing position or ink dot placement detecting optical system for detecting the landing position or ink dot placement of ink discharged from the ink jet heads 120, 121, and 122. Reference numeral 610 denotes a head stage for moving the head units 606 in the X direction, reference numeral 611 denotes pillars for supporting the head stage 610, and reference numeral 612 denotes a head θ motor attached above the head units 606 for rotating the entire head unit. Reference numeral 613 denotes a supporting arm mounted to the head stage, mounting a valve box 614 having a three-way valve and dissolved oxygen meter which are part of the ink supplying system, the supporting arm 613 supporting the head θ motor 612 and the head units 606. Driving the head stage 610 allows the head unit supporting arm 613 to be moved from the center portion to the end in the X direction in a manner integral with the head units 606 and valve box 614. Then, moving the supporting arm 613, head units 606 and valve box 614 to the end of the head stage 610 allows attachment work for the head units 606, replacement work, and positional adjustment work of the ink jet heads (120a, 120b, 121a, 121b, 122a, 122b) to be performed. Also, with an apparatus such as the present embodiment wherein there are two head units 606, the head stage 610 has a mechanism for positioning the relative position of the two units 606 in the X direction on the order of microns.

Reference numeral 615 denotes a recovery unit which has a cap for capping the nozzles (ink discharging orifices) 132 of the ink jet heads and receiving ink discharged from the nozzles 132, and a wiping blade for wiping away ink adhering to the nozzle surfaces, and that can be lowered to directly below the head unit 606. Reference numeral 616 is a cleansing unit for cleansing the cap and wiping blade built into the recovery unit 615, reference numeral 617 denotes a thermal chamber configured so as to cover the entire color filter manufacturing apparatus, for strictly managing the temperature within the device, and reference numeral 618 denotes a glass substrate carry-in carry-out mechanism provided within the thermal chamber 617 for guiding (transporting) the glass substrate being transported from outside of the thermal chamber 617 into the color filter manufacturing apparatus and for discharging the glass substrate out from the thermal chamber 617 to the outside of the color filter manufacturing apparatus. Reference numeral 619 is an ink supplying system unit which is positioned outside of the thermal chamber 617, for supplying and discharging ink to valve box 614 by a tube harness 620 passing through a hole 621 opened in the thermal chamber 617. One ink supplying system 619 is provided for each of the head units 606. The ink supplying systems 619 comprise main ink tanks 301a–301c for storing the RGB inks, main pumps 302, sub-ink tanks 401a–401c, main deaerators 511a–511c, and so forth.

Ink supplying tubes 625 and electric signal cables (not shown) are independently connected to each of the ink jet heads 120a, 120b, 121a, 121b, 122a, and 122b, with the other side of the electric signal cables being connected to a control unit (controller) comprised of a personal computer or the like positioned outside of the thermal chamber 617. The ink jet heads 120a, 120b, 121a, 121b, 122a, and 122b are configured so as to each be capable of independently discharging ink.

Also, the other ends of the ink supplying tubes 625 are connected to a three-way valve within the valve box 614, which houses the three-way valve, dissolved oxygen meter, and so forth, by a coupler 626. A cable bundle (not shown) of cables for driving the three-way valves and sensor cables for the dissolved oxygen meters extends from the valve box 614, and in the same manner as with the tube harness 620 passes through a hole opened in the thermal chamber 617 and is connected to an external control unit.

Also, a dummy substrate (not shown) is mounted at the time of assembly adjusting of the apparatus or the like, so as to perform alignment of the substrate in the X, Y, and θ directions with the alignment detecting system 607, thereby drawing an evaluating pattern with the ink jet heads 120, 121, and 122. Further, the X-Y stage 603 is moved, and the ink dot placement is measured with the ink dot placement detecting system 609. Thus, the coordinates of the alignment detecting system 607 and the coordinates of the ink dot placements of the ink jet heads 120, 121, and 122 can be accurately measured. Note that the coordinate values do not change even if another substrate is mounted, so this only needs to be performed at the time that system parameters have been changed, such as at the time of assembling the apparatus, replacing ink jet heads, and so forth. The ink dot placement may be measured with another apparatus, so as to reproduce the measurement value at the color filter manufacturing apparatus.

At the time of coloring the color filter, mounting the coloring glass substrate 605 on the θ-Z tilt stage 604 allows the alignment detecting system 607 to detect the amount of offset between the glass substrate 605 and the ink jet heads 120, 121, and 122 in the three directions of X, Y, and θ. Based on the detection results, the offset of the θ component is corrected by the θ-Z tilt stage 604, and offset in the X direction is corrected by performing positioning in the X direction of the X-Y stage 603. Also, the offset in the Y direction (main scanning direction), which is the coloring direction, is corrected by performing positioning in the Y direction of the X-Y stage 603, or by discharge timing control of the ink jet heads 120, 121, and 122. Further, the landing position changes in the event that the gap between the glass substrate 605 and the ink jet heads 120, 121, and 122 changes. Accordingly, the gap and inclination of each is calculated by the Z detecting systems 608a through 608c, and drawing is performed with the ink jet heads 120, 121, and 122 while controlling the gap to be constant. Depending on the precision, measurements and corrections may be made at the time of mounting the glass substrate, and then the substrate remains fixed while drawing.

Each ink jet head unit 606 has a configuration such as shown in FIG. 16, with head positioning jigs (ink jet head mounting portions) 1000, 1001, and 1002 provided corresponding to the respective colors. These head positioning jigs (ink jet head mounting portions) are for mounting multiple ink jet heads, and also are for determining and fixing the relative position between the heads. As can be seen from the figure, multiple ink jet heads of the same color are mounted on one head mounting portion. Although two ink jet heads of the same color are mounted on each head mounting portion here, the number of heads to be mounted is not restricted to two, as long as multiple heads are mounted. The first ink jet head (120a, 121a, and 122a) and the second ink jet head (120b, 121b, and 122b) are positioned such that the center lines of the nozzle rows (ink discharging orifice rows) of each head match. That is to say, both the first ink jet head and the second ink jet head are mounted on the head mounting portion such that the nozzle rows (ink discharging orifice rows) of the first ink jet head and the nozzle rows (ink discharging orifice rows) of the second ink jet head are aligned along a straight line. Also, the direction of array of the multiple ink jet heads is the same direction as the array direction of the nozzles. Although described in detail later, the first ink jet heads (120a, 121a, and 122a) are fixed to the mounting unit, while on the other hand the second ink jet heads (120b, 121b, and 122b) are capable of moving in the same direction as the nozzle array direction. Then, before coloring the color filter, the second ink jet heads are moved in the direction of the nozzle rows, relative positioning adjustment is performed between the first ink jet heads and the second ink jet heads, and the second ink jet heads are fixed to the mounting portion. Following the first ink jet heads and the second ink jet heads being thus fixed to the mounting portion, the color filter is colored.

<Configuration of Controller of Color Filter Manufacturing Apparatus>

Figure 17:
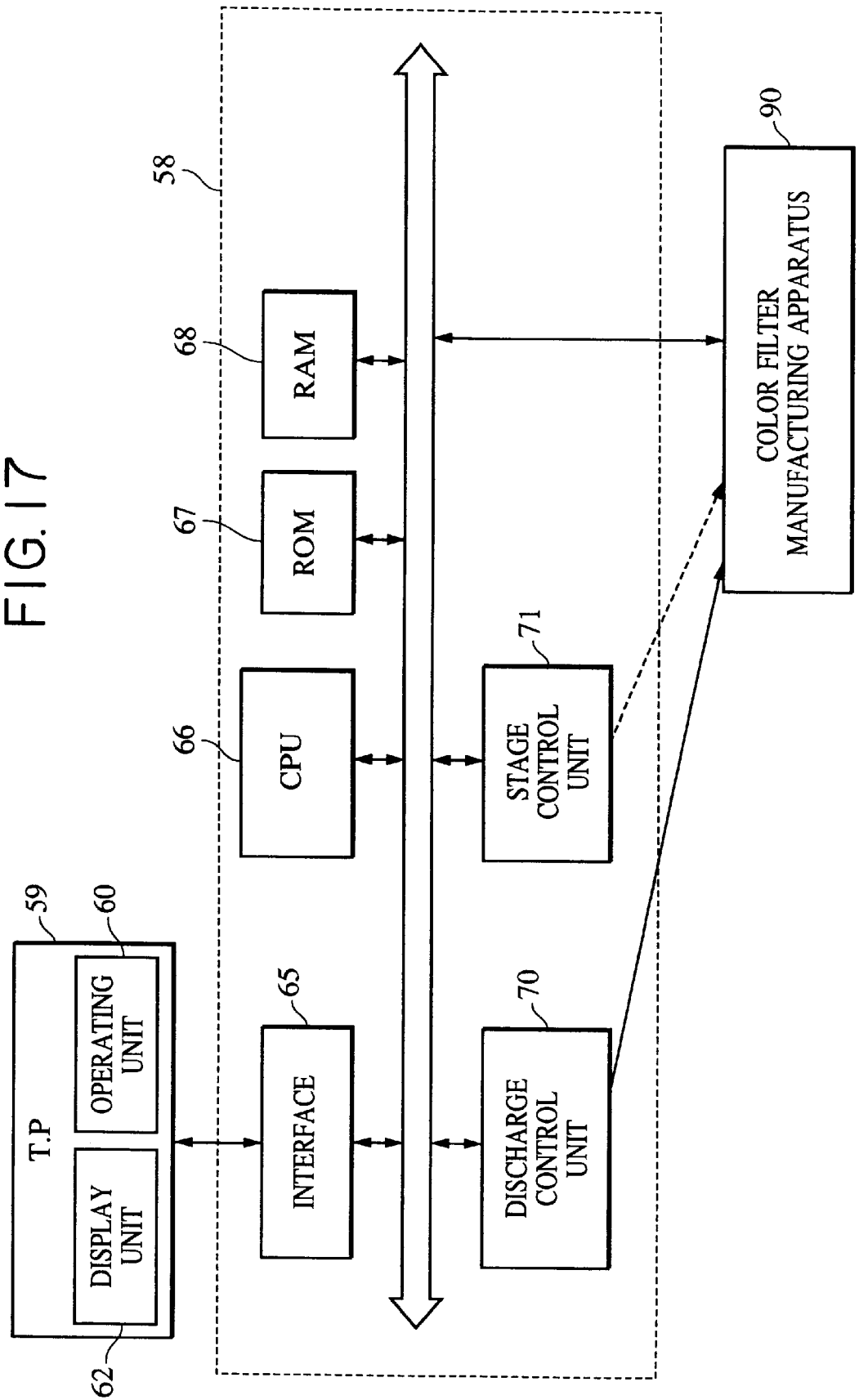
FIG. 17 is a diagram illustrating the configuration of the control unit for controlling the operation of the color filter manufacturing apparatus.

FIG. 17 is a configuration diagram of the controller (control unit) of the color filter manufacturing apparatus 90 according to the present embodiment. Personal computer 59 functions as an input/output unit for controller 58, and display unit 62 is for displaying information relating to the state of progression of manufacturing, or abnormalities such as head trouble or the like. Also, operating unit 60 is for instructing the operations of the color filter manufacturing apparatus 90.

The controller 58 is for controlling the operations of the color filter manufacturing apparatus 90, and interface 65 exchanges data between the personal computer 59 and the controller 58. Reference numeral 66 denotes a CPU for controlling the color filter manufacturing apparatus 90, reference numeral 67 denotes a ROM storing control programs for operating the CPU, reference numeral 68 denotes a RAM which is used as a work area for the CPU and stores various types of data, as well as information and the like relating to abnormalities and for adjusting the ink dot placement of ink discharged from the nozzles, reference numeral 70 denotes a discharge condition control unit for controlling discharging of the ink to the filter elements of the color filter, reference numeral 71 denotes a stage control unit for controlling the operation of the X-Y stage 603 of the color filter manufacturing apparatus 90, and reference numeral 90 denotes the color filter manufacturing apparatus which is connected to the controller and operates according to the instructions thereof.

<Schematic Configuration of the Ink Jet Heads>

Figure 18:
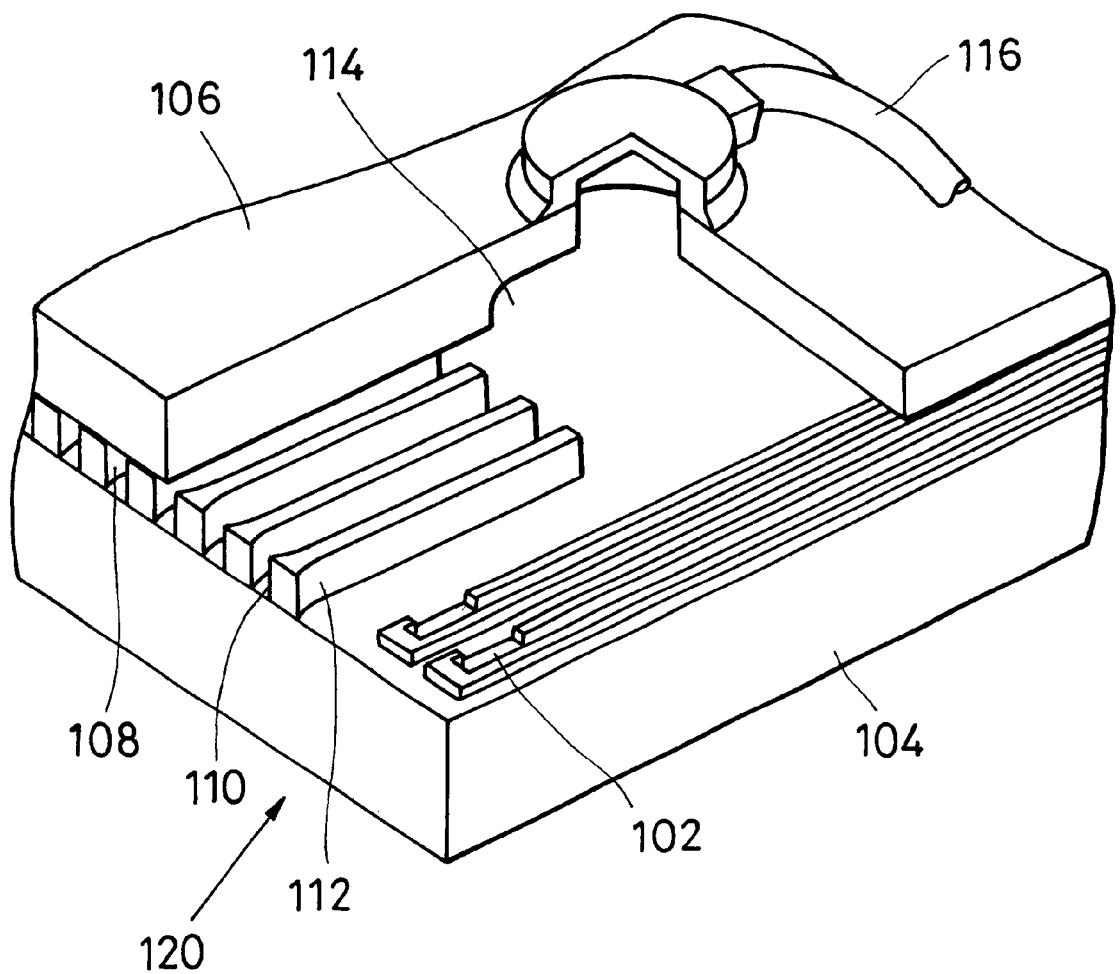
FIG. 18 is a diagram illustrating the structure of the ink jet head used with the color filter manufacturing apparatus.

Next, FIG. 18 is a diagram illustrating the configurations of the ink jet heads 120, 121, and 122 used with the above color filter manufacturing apparatus. Although FIG. 13 illustrates the ink jet heads being individually provided for the three colors of R, G, and B, the heads themselves for these three colors are each of identical configuration, so FIG. 18 representatively illustrates the structure of one of the RGB color heads. Note that heaters are used as the energy providing devices in FIG. 18.

In FIG. 18, the ink jet head 120 is comprised of a heat board 104 which is a substrate upon which multiple heaters 102 have been formed for heating the ink, and a lid 106 which is placed over the heat board 104. Multiple discharge orifices 108 are formed on the lid 106, and liquid channels 110 are formed corresponding with respective discharge orifices 108. The liquid channels 110 are separated from adjacent liquid channels by partitions 112. Each of the liquid channels 110 are connected at the back side to a shared liquid chamber 114, with ink being supplied to the ink liquid chamber 114 from an ink supplying tube 116, and the ink being supplied from the liquid chamber 114 to each of the liquid channels 110.

The heat board 104 and lid 106 are assembled such as shown in FIG. 18, so that each heater aligns at a position corresponding to respective liquid channel 110. Although only two heaters 102 are shown in FIG. 18, one heater 102 is provided for each liquid channel 110. Supplying predetermined driving pulses (driving signals) to the heaters 102 causes the ink around the heaters 102 to boil and form bubbles. The volume expansion of the bubbles causes the ink to be pushed out from the discharge orifices 108, thus performing ink discharging. Accordingly, the size of bubbles can be adjusted by controlling the driving pulses applied to the heater 102, thereby freely controlling the volume of the ink discharged from the discharge orifices. Note that parameters to be controlled include the electric power to be applied to the heaters, and so forth.

<Method for Controlling the Amount of Ink Discharge>

Figure 19:
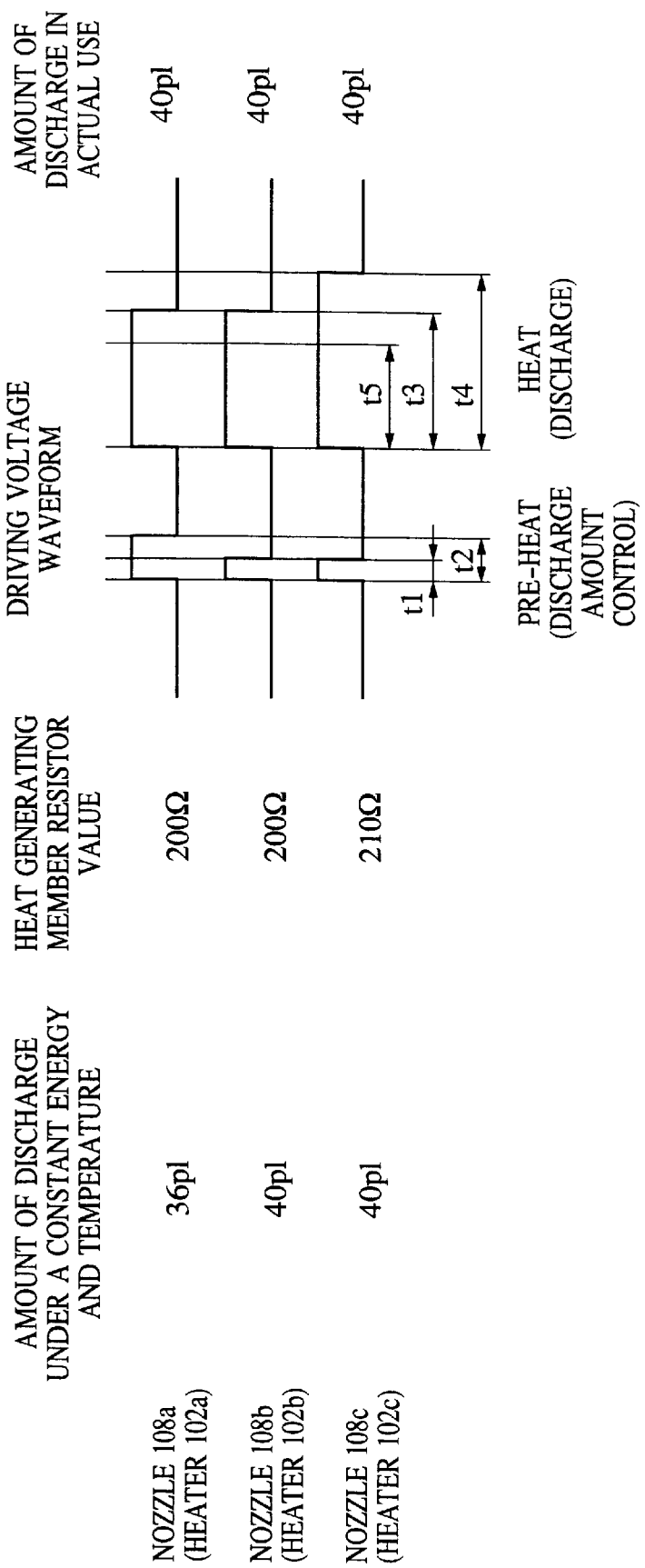
FIG. 19 is a diagram illustrating the voltage waveform applied to the heaters of the ink jet head.

FIG. 19 is a diagram describing the method for changing the electric power to be applied to the heaters so as to control the amount of ink discharged.

With the present embodiment, two types of constant-voltage pulses are applied to the heaters 102, in order to adjust the amount of ink discharged. The two pulses are the preheating pulse and the main heating pulse (hereafter simply referred to as "heating pulse") as shown in FIG. 19. The preheating pulse is a pulse for heating the ink to a predetermined temperature before actually discharging the ink, and is set to a value which is shorter than the pulse width t5 that is minimally necessary for discharging the ink. Accordingly, there is no ink discharged by the preheating pulse. The reason that the preheating pulse is applied to the heaters 102 is to raise the initial temperature of the ink to a certain temperature, so that the amount of ink discharged at the time of subsequently applying constant heat pulses is always constant. Also, adjusting the length of the preheating pulse may be performed to adjust the temperature of ink beforehand, so as to change the amount of ink discharge under application of the same heat pulses. Further, heating the ink before applying the heat pulses acts to speed up the time-wise startup of ink discharging under application of heat pulses so as to improve response.

On the other hand, the heat pulses are pulses for actually causing the ink to be discharged, and are set longer than the pulse width t5 that is minimally necessary for discharging ink. The energy generated by the heaters 102 is proportionate to the width of the heat pulse (application time), so adjusting the width of this heat pulse allows irregularities in the properties of the heaters 102 to be adjusted.

Also, adjusting the intervals between the preheating pulses and the heating pulses allows controlling of the dispersion state of heat due to the preheating pulses, consequently enabling adjusting of the discharge amount of ink by this means as well. Also, changing the voltage value of the voltage pulses provided (applied) to the heaters, i.e., changing the driving voltage of the head, can also be used to adjust the discharge amount of ink.

As can be understood from the above description, the amount of ink discharged can be controlled by adjusting the pulse application time (pulse width) of the preheating pluses and heating pulses, can be controlled by adjusting the interval between the preheating pulses and heating pulses, and further can be controlled by adjusting the driving voltage of the head. Accordingly, adjusting the application time of the preheating pulses and heating pulses applied, the application intervals of the preheating pulses and heating pulses, and the head driving voltage and the like, as necessary, allows the amount of ink discharged and the response to applied pulses for ink discharge to be adjusted at will. Particularly, in the event of coloring color filters, the coloring concentration (color concentration) between each filter element and within each filter element is preferably generally uniform, in order to control irregularities in color, and accordingly there are cases wherein control is performed such that the amount of ink discharged from each nozzle is the same. The amount of ink being discharged from each nozzle means that the amount of ink being jetted onto each filter element is the same, so the coloring concentration can be made to be generally the same from one filter element to the next. Also, irregularities in color within the same filter element can be reduced. Accordingly, in the event that the amount of ink discharge for each nozzle is to be adjusted to be the same, performing the above-described ink discharging amount control is sufficient.

Next, the adjustment of the ink discharge amount described above will be described in further detail.

Description will now be made regarding cases wherein the amount of ink discharged from the nozzles differs in the event that the same energy is provided to the discharge orifices (nozzles) 108a, 108b, and 108c, for example, as shown in FIG. 19. Specifically, at the time of applying a constant energy under a constant temperature, the amount of ink discharged from the nozzle 108a is 36 pl (picoliters), the amount of ink discharged from the nozzle 108b is 40 pl, and the amount of ink discharged from the nozzle 108c is 40 pl, wherein the resistance value of the heater 102a of the nozzle 108a and of the heater 102b of the nozzle 108b is 200 Ω and wherein the resistance value of the heater 102c of the nozzle 108c is 210 Ω. Let us say that we want to set the amount of ink discharged from the nozzles 108a, 108b, and 108c all to be 40 pl.

In order to adjust the amount of ink discharged from the nozzles 108a, 108b, and 108c to be the same, the width of the preheating pulses and the heating pulses should be adjusted, but various combinations of widths can be conceived for the preheating pulses and the heating pulses. Here, we will make adjustment by setting the amount of energy generated by the heating pulses to be the same for all three nozzles, and the amount of ink discharged will be adjusted by adjusting the width of the preheating pulses.

First, the resistance values of the heater 102a of the nozzle 108a and of the heater 102b of the nozzle 108b are both 200 Ω, so in order to make the energy generated by the heating pulses the same, voltage pulses of the same width should be applied to the heaters 102a and 102b. Here, the width of the voltage pulse is set to a time t3 which is longer than the aforementioned t5. On the other hand, the nozzles 108a and 108b differ in amount of ink discharged upon application of the same energy, i.e., 36 pl and 40 pl, so a preheating pulse of t2 is applied to the heater 102a which is longer than the preheating pulse of t1 applied to the heater 102b, so as to increase the amount discharged from the nozzle 108a. Thus, the discharge of amount of the nozzles 108a and 108b can be matched at 40 pl.

On the other hand, the resistance value of the heater 102c of the nozzle 108c is 210 Ω, which is greater than the resistance value of the other two heaters 102a and 102b, so the heating pulse width needs to be made longer than that of the other two heaters in order to generate the same energy for the heater 102c. Accordingly, the width of the heating pulse applied here is set to a time t4 which is longer than the aforementioned t3. Also, regarding the width of the preheating pulse, the amount of discharge of the nozzles 108b and 108c under application of constant energy is the same, so this should be matched with the heater 102b, and so preheating pulses of t1 in width are applied thereto.

Thus, the amount of ink discharged from three nozzles 108a, 108b and 108c, with differing resistance values and differing ink discharging amounts under constant energy, can be made to be the same. Also, the amount of ink discharged can be intentionally changed by the same means. Note that the preheating pulses are used to reduce irregularities in discharge from one nozzle to another.

<Detailed Configuration of the Ink Jet Head Unit>

Figure 20:
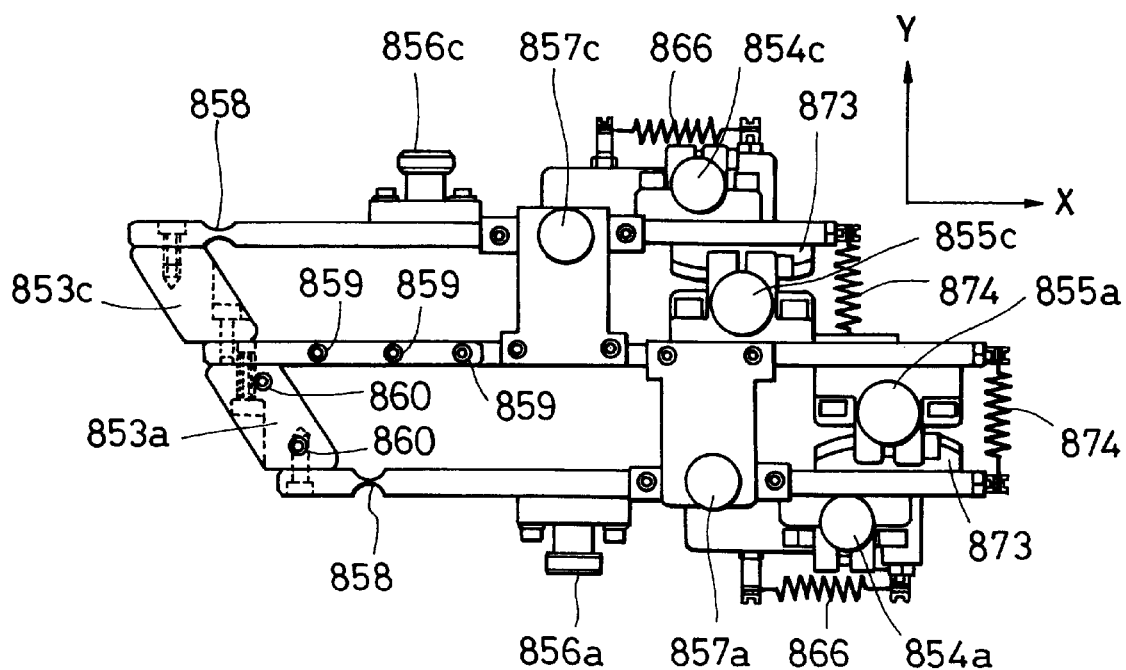
FIG. 20 is a plan view illustrating the configuration of the ink jet head unit 606.
Figure 21:
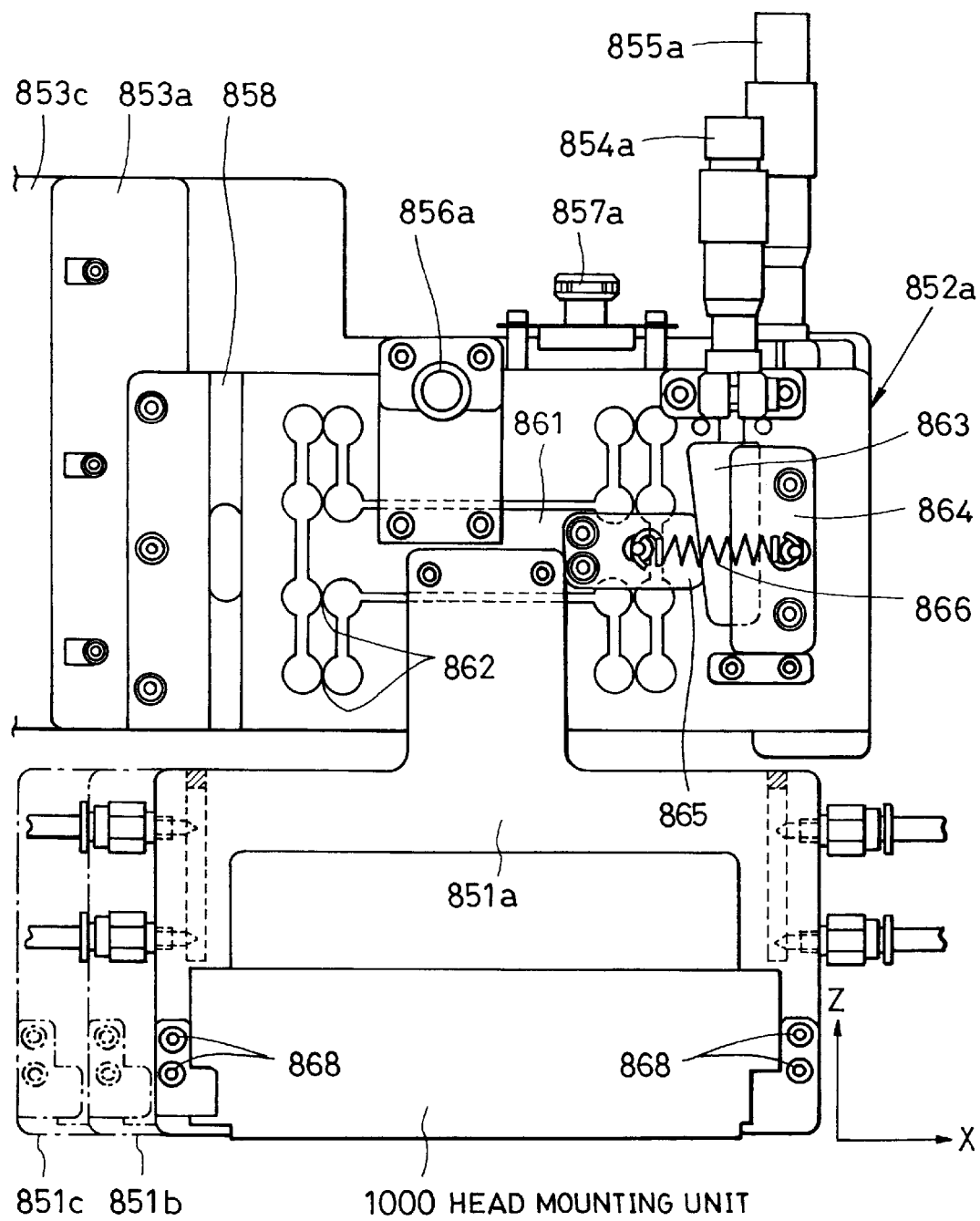
FIG. 21 is a frontal view illustrating the configuration of the ink jet head unit 606.
Figure 22:
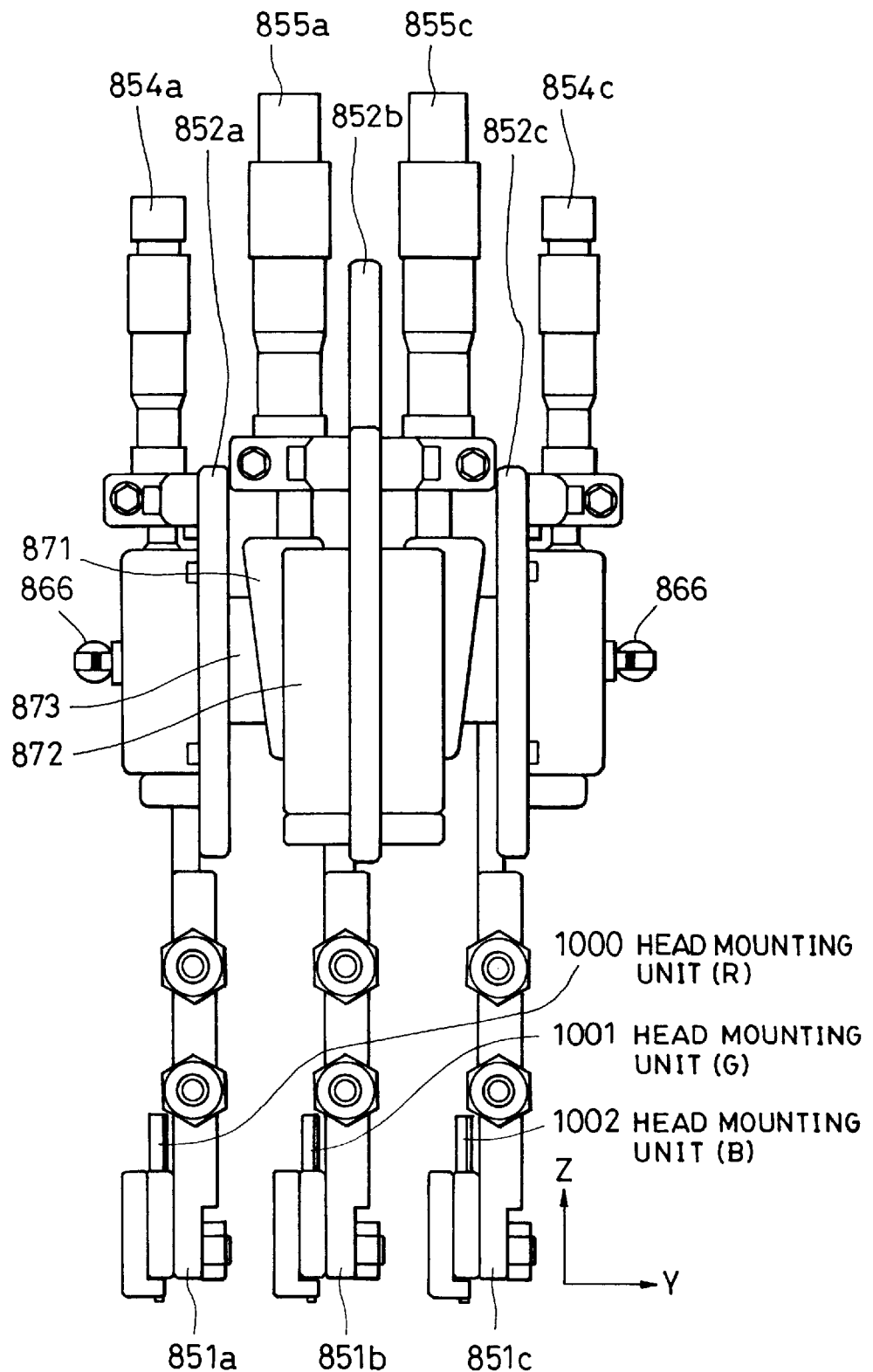
FIG. 22 is a side view illustrating the configuration of the ink jet head unit 606.

Next, detailed configuration of an ink jet head unit applicable to the present embodiment will be described with reference to FIGS. 20 through 22. FIGS. 20, 21, and 22 are a plan view, frontal view, and side view, respectively illustrating the configuration of the ink jet head unit 606. Note that, as described with reference to FIG. 16, the ink jet head unit 606 is arranged such that the ink jet heads 120a and 120b for discharging red (R) ink are mounted to the head mounting portion 1000 (head mounting jig), the ink jet heads 121a and 121b for discharging green (G) ink are mounted to the head mounting portion 1001 (head mounting jig), and the ink jet heads 122a and 122b for discharging blue (B) ink are mounted to the head mounting portion 1002 (head mounting jig).

Also, in FIG. 16, the two sets of ink jet heads (120, 121, and 122) for the colors R, G, and B, comprise first ink jet heads (120a, 121a, and 122a) which are completely fixed to the head mounting portions (1000, 1001, and 1002), and second ink jet heads (120b, 121b, and 122b) which are mounted so as to be movable in the direction parallel to the nozzle row direction relative to the first ink jet heads. As the first stage in performing relative positional adjustment of the ink jet heads, the head mounting portions are each moved so as to perform positional adjustment of the first ink jet heads completely fixed to the head mounting portions, and next, as the second stage, the relative position of the second ink jet heads as to the first ink jet heads is adjusted.

In FIGS. 20 through 22, the head mounting portions 1000, 1001, and 1002 are each fixed to arms 851a through 851c, the arms 851a through 851c are each fixed to adjusting plates 852a through 852c, and the adjusting plates 852a through 852c are each mutually fixed by fixing blocks 853a and 853c. Reference numerals 854a and 854c denote micrometers for positioning the head mounting portions 1000 and 1002 in the nozzle direction (X-direction) with the head mounting portion 1001 as a reference, reference numerals 855a and 855c denote micrometers for positioning the head mounting portions 1000 and 1002 in the rotational direction on a plate parallel to the coloring plate (X-Y plane) with the head mounting portion 1001 as a reference, reference numerals 856a and 856c denote locking screws for locking the position of the head mounting portions 1000 and 1002 relative to that of the head mounting portion 1001 following performing positioning in the above X direction, and reference numerals 857a and 857c denote locking screws for locking the relative position of the head mounting portions 1000 and 1002 relative to that of the head mounting portion 1001 in the rotational direction following performing rotational direction positioning.

The arms 851a through 851c and the adjusting plates 852a through 852c are each formed of stainless steel plates of around 7 mm in thickness, wherein the adjusting plates 852a through 852c have a portion with reduced rigidity (a hinge portion) 858 by forming of grooves and openings near the fixing blocks 853a and 853c, so as to rotate on the hinge portion 858. The adjusting plates 852a and 852c leave a small portion (warping portion) 862 for attaching the arms 851a and 851c, separated from the other portions of the adjusting plates 852a and 852c by openings and slits, so that the arm attaching portion 861 is movable relative to the other portions of the adjusting plates 852a and 852c within the plane shown in FIG. 21.

In order to position the head mounting portion 1000 in the X direction, the lock screw 856a is loosened, and the micrometer 854a is rotated. A wedge 863 fixed to the tip of the micrometer 854a moves vertically in FIG. 21 (in the Z direction) along a guide 864 fixed to the adjusting plate 852a according to the direction of rotation, and a metal piece 865 against which the side of the wedge 863 is sliding moves to the right or left (X direction) in FIG. 21. The metal piece 865 is fixed to the arm attaching portion 861 which is movable in the X direction relative to other parts of the adjusting plate 852a, so the metal piece 865 sliding in the X direction moves the head mounting portion 1000 in the X direction relative to the head mounting portion 1001, thereby positioning relatively. Following positioning, the lock screw 856a is tightened, and the position of the arm attaching portion 861 in the adjusting plate 852a is fixed. A spring 866 returns the arm attaching portion 861 to the right direction in FIG. 21 in the event that the wedge 863 is raised, and applies force to the metal piece 865 in the right direction in FIG. 21 to this end.

In order to perform rotational direction positioning of the head mounting portion 1000 within a plane parallel to the coloring plane, i.e., in order to make the ink jet head 120a of the head mounting portion 1000 and the ink jet head 121a of the head mounting portion 1001 to be parallel, the lock screw 857a is loosened, and the micrometer 855a is rotated. A wedge 871 fixed to the tip of the micrometer 854a moves vertically in FIG. 22 (in the Z direction) along a guide 872 fixed to the adjusting plate 852b in a manner parallel to the adjusting plate 852b according to the direction of rotation, and a metal piece 873 against which the side of the wedge 871 is sliding moves to the right or left (Y direction) in FIG. 22. The metal piece 873 is fixed to the tip part of the adjusting plate 852a (the opposite side from the fixing block 853), and the adjusting plate 852a is configured so that the tip side thereof rotates on the hinge portion 858 as to the fixing block 853, so the metal piece 873 moving in the Y direction causes the ink jet head 120a of the head mounting portion 1000 to rotate within a plane parallel to the X-Y plane relative to the ink jet head 121a of the head mounting portion 1001, thereby performing rotational direction positioning, i.e., making head 120a parallel with the ink jet head 120b. Following the positioning, the lock screw 857a is tightened, and the rotational direction of the adjusting plate 852a relative to the adjusting plate 852b is fixed. Spring 874 is for returning the tip side of the adjusting plate 852a toward the adjusting plate 852b in the event that the wedge 871 rises.

The adjusting plate 852c is also configured in the same manner as the adjusting plate 852a, and is thus positioned relative to the adjusting plate 852b. Note that the above deals with the positioning of the ink jet head 120a of the head mounting portion 1000 and the ink jet head 121a of the head mounting portion 1001 in the direction orthogonal to the coloring direction (Y direction), i.e., positioning in the X direction, and positioning thereof in the rotational direction within a plane parallel to the coloring plane (X-Y plane), i.e., pivoting on the Z-directional axis, but positioning in the Z direction is performed at the time of attaching the arms 851a through 851c, to which the head mounting portions 1000 through 1002 are fixed, onto the adjusting plates 852a through 852c, by pressing the reference planes of the head mounting portions 1000 through 1002 against a jig formed of a hyperplane and tightening attaching screws 868. The height of the nozzle faces of the ink jet heads 120a, 120b, 121a, 121b, 122a, and 122b are positioned so as to be a predetermined height from the reference planes of the head mounting portions 1000 through 1002.

The ink jet head unit 606 thus assembled and positioned is hung and fixed from the bottom plane of a head θ motor 612 of the color filter manufacturing apparatus shown in FIG. 13, using the screw holes 859 and 860 shown in FIG. 20.

<Configuration of the Head Mounting Portion>

Figure 23:
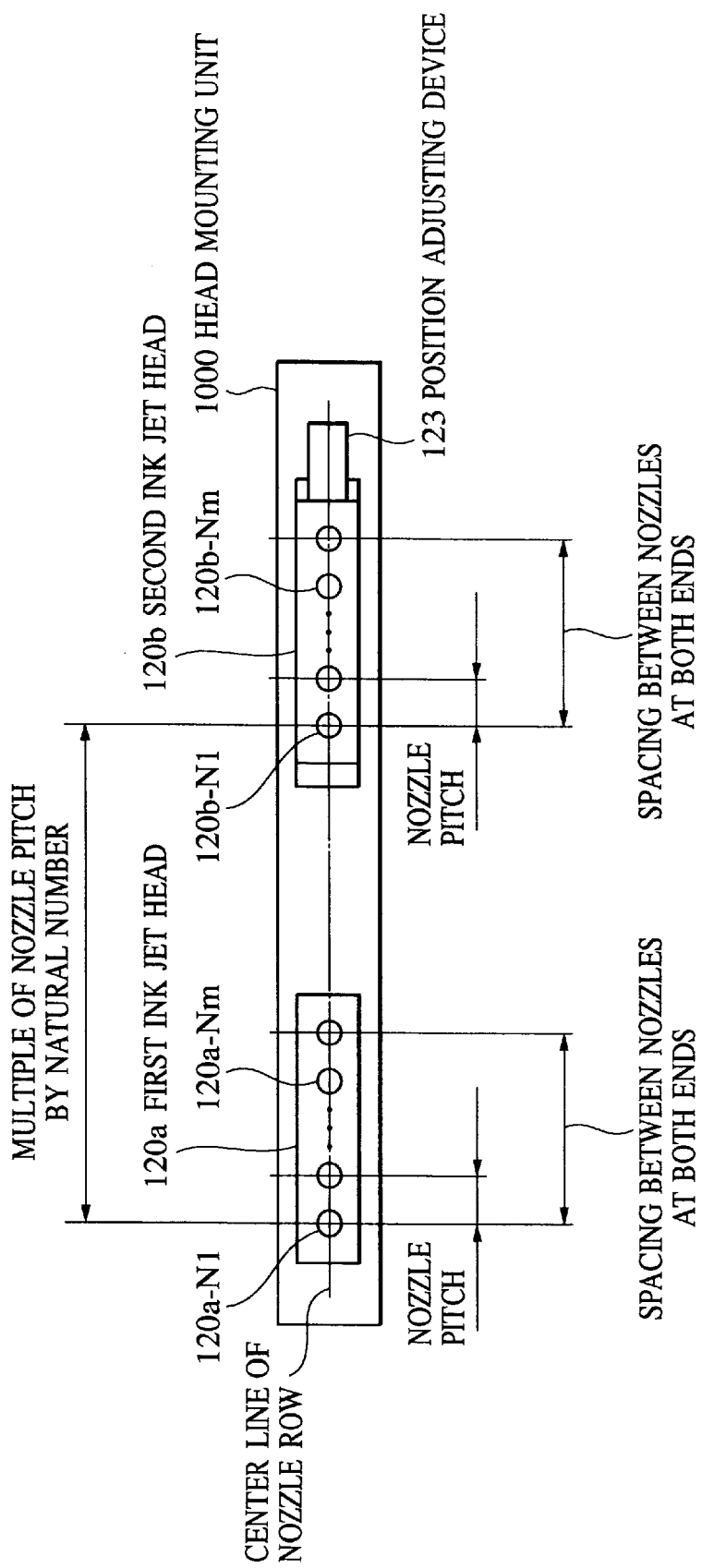
FIG. 23 is a diagram illustrating the detailed configuration of the head mounting unit.

Next, the detailed configuration of the head mounting portions (head fixing jigs) 1000, 1001, and 1002 will be described with reference to FIG. 23. The head mounting portions 1000, 1001, and 1002 each have identical configurations, so FIG. 23 illustrates the configuration of only one, the head mounting portion 1000.

The head mounting portion 1000 has a first ink jet head 120a fixed thereto, and also has a second ink jet head 120b positioned so that the nozzle row of the first ink jet head 120a and the nozzle row of the second ink jet head 120b are in a straight line. Also, a piezoelectric device actuator 123 is attached to the head mounting portion 1000, and the second ink jet head 120b can be moved in the nozzle row direction by moving the actuator 123. That is to say, the actuator 123 functions as a position adjusting device in the nozzle direction for the head, and this position adjusting device 123 (actuator) is what enables positional adjustment of second ink jet head 120b in the nozzle row direction.

With the present embodiment, at the time of performing positioning of the second ink jet head 120b on the head mounting position 1000, control is performed such that the spacing between the first nozzle of the first ink jet head 120a (120a-N1) and the first nozzle of the second ink jet head 120b (120b-N1) is a distance which is a multiple of the nozzle pitch by a natural number, e.g., 200 nozzles worth. Specifically, the voltage value applied to the piezoelectric device actuator 123 is changed such that the distance between the first nozzles of the heads, i.e., the distance between nozzle 120a-N1 and nozzle 120b-N1 becomes a predetermined set distance (a distance of the nozzle pitch multiplied by N). As the voltage value applied to the actuator 123 changes, the amount of movement of the second ink jet head also changes. Increasing the voltage value applied to the actuator 123 increases the amount of movement of the second ink jet head, and on the other hand, reducing the voltage value applied to the actuator 123 reduces the amount of movement of the second ink jet head. Note that there is no need to continue applying the voltage to the actuator unit at the time of starting coloring with the ink jet heads; rather, once the voltage value to be applied is determined, the voltage can be turned off, and then the voltage can be applied again at the time that the head unit is mounted to the color filter manufacturing device. Thus, the ink jet head 120b can be adjusted to a desired position relative to the ink jet head 120a. Note that the first nozzle of the first ink jet head 120a (120a-N1) is the nozzle which is situated farthest from the second ink jet head 120b, and the first nozzle of the second ink jet head 120b (120b-N1) is the nozzle which is situated closest to the first ink jet head 120a.

Thus, the positional relation of the first ink jet head and the second ink jet head is determined. Now, while an example has been described wherein the second ink jet head is moved in the nozzle direction by an actuator of a piezoelectric device as a position adjusting device, the present invention is not restricted to this arrangement, and may use a pneumatic pressure actuator instead, for example. That is to say, any position adjusting device can be suitably used with the present embodiment so long as the ink jet head can be moved in the nozzle row direction so as to perform positional adjusting of the ink jet head in the nozzle row direction, upon the head mounting unit. Also, although the above description involves the relative position of the first ink jet head and the second ink jet head being determined such that the spacing between the first nozzle of the first ink jet head (120a-N1) and the first nozzle of the second ink jet head (120b-N1) is a distance which is a multiple of the nozzle pitch by a natural number, the relative position adjusting method according to the present embodiment is not restricted to this. For example, an arrangement may be made wherein the spacing between the m'th nozzle (wherein m is a natural number) of the first ink jet head 120a (120a-Nm) and the m'th nozzle of the second ink jet head 120b (120b-Nm) is a distance which is a multiple of the nozzle pitch by a natural number. That is to say, it is sufficient to adjust the relative position of the two heads such that the spacing between an arbitrary nozzle of the first ink jet head and an arbitrary nozzle of the second ink jet head is a multiple of the nozzle pitch by a natural number.

Figure 24:
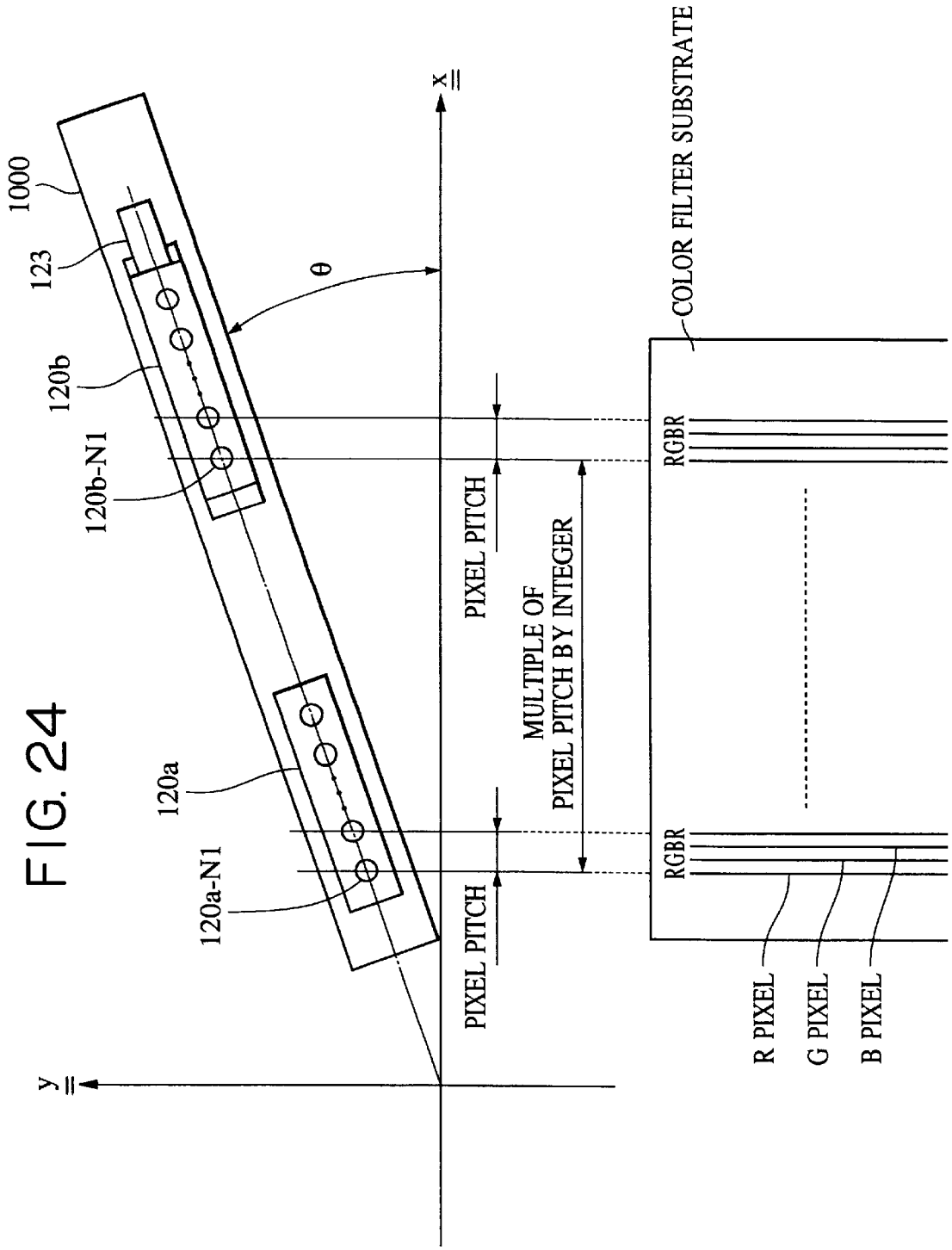
FIG. 24 is a diagram illustrating a state wherein the ink jet head has been rotated by an amount of θ so as to match the pixel pitch of the color filter.

In this way, a head unit comprising two ink jet heads of the same color is completed by positioning and fixing the first ink jet head and the second ink jet head on the head mounting portion 1000 such that the nozzle row of the first ink jet head 120a and the nozzle row of the second ink jet head 120b are in a straight line and such that the spacing between arbitrary nozzles of the two ink jet heads (the spacing between an arbitrary nozzle of the first ink jet head and an arbitrary nozzle of the second ink jet head) is a multiple of the nozzle pitch by a natural number. The spacing between the two ink jet heads (the first ink jet head and the second ink jet head) being set to a multiple of the nozzle pitch by a natural number means that, regardless of the pixel pitch of the color filter, rotating the head unit comprising the head mounting portion allows the nozzle positions and pixel positions to be matched, and consequently, multiple types of color filters can be manufactured using this head unit. Also, two heads of the same color are mounted within the same head unit, so manufacturing time can be markedly reduced as compared to arrangements manufacturing color filters using head units having only one head for a color. Now, FIG. 24 is a diagram illustrating the ink jet head being rotated by an amount of θ so as to match the pixel pitch of the color filter. In the event of using an ink jet head with a nozzle pitch which does not match the pixel pitch, all that is necessary is to rotate the head angle. For example, in the event of performing angle adjustment of the R head (120a, 120b), the R head is rotated by an amount of θ so that the nozzle pitch in the X direction of the R head matches the pitch of the pixel row of the R color adjacent in the X direction. Thus, the R head nozzle positions and the R color pixel positions are matched, and the R head can be used to color the pixel rows. Also, although in FIG. 24 the X directional distance of the adjacent nozzles is matched with the pixel pitch, the present invention is not restricted to this arrangement, and in the event that a color filter is to be colored using every K'th nozzle of the of the R head (wherein K is a natural number) for example, all that is necessary is to match the distance of the K'th nozzles in the X direction with the pixel pitch.

<Coloring Operation of the Color Filter>

Next, the coloring operation of actually coloring a color filter using the head unit 606 comprising the RGB head mounting portions 1000, 1001, and 1002 will be described. Here, description will be made with reference to the flowchart in FIG. 25 regarding a case wherein the head unit 606 is mounted to the color filter manufacturing apparatus shown in FIG. 13 and a color filter is colored with the manufacturing apparatus.

First, in step S1, the head unit 606 is mounted to the color filter manufacturing apparatus, and a predetermined voltage value is applied to the actuator (position adjusting device), thereby adjusting the spacing between the first ink jet heads (120*a*, 121*a*, and 122*a*) and second ink jet heads (120*b*, 121*b*, and 122*b*). As described above, the distance between nozzles of the first ink jet head and nozzles of the second ink jet head is a multiple of the nozzle pitch by N (wherein N is a natural number). Also, at the time of the head unit 606 being mounted to the color filter manufacturing apparatus, applying the predetermined voltage value to the position adjusting device reproduces the distance between the heads once adjusted, and relative positional adjusting of the second ink jet head as to the first ink jet head is thus carried out.

Figure 26:
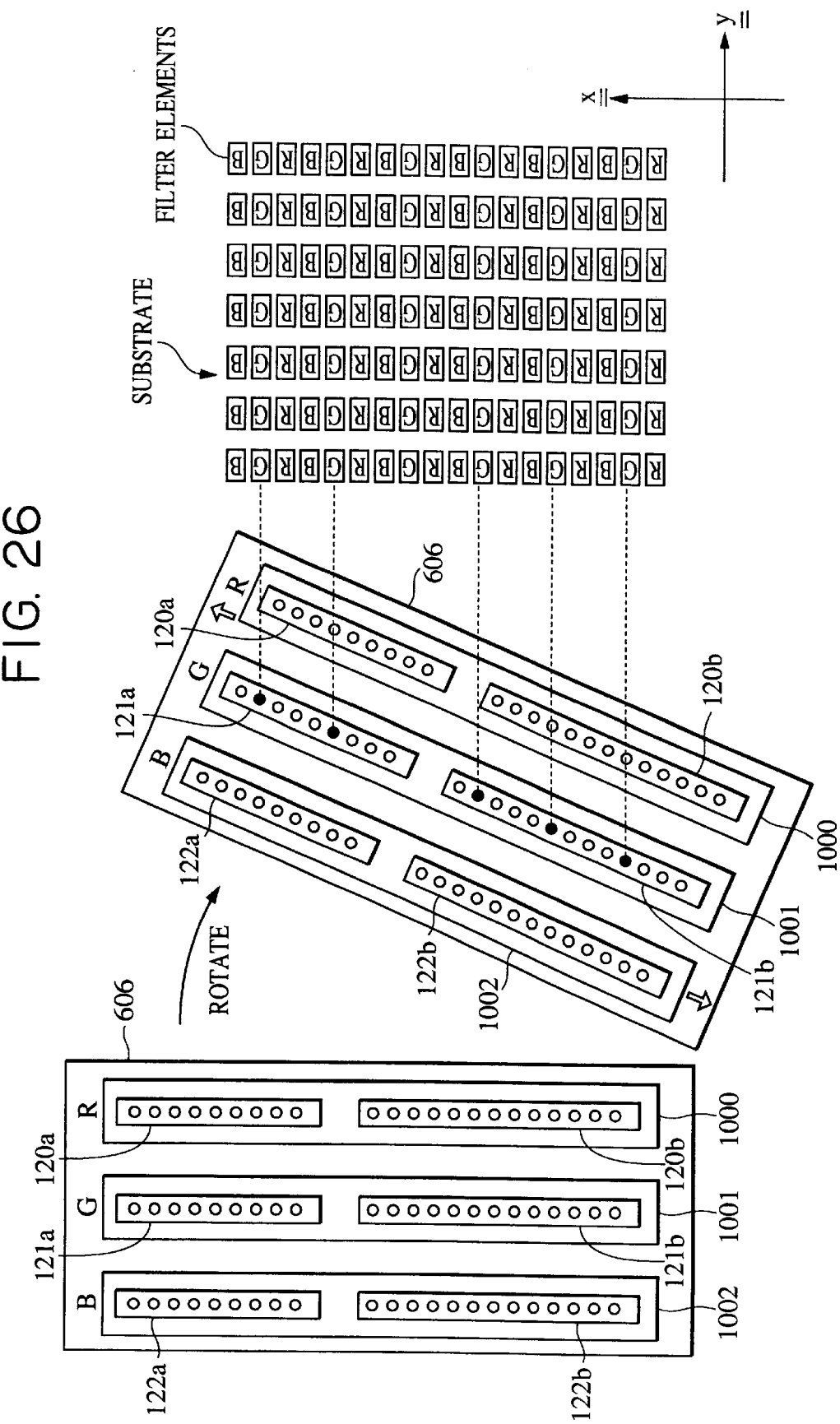
FIG. 26 is a diagram illustrating the manner in which the head and substrate are positioned.

Next, in step S2, the entire head unit 606 is rotated as shown in FIG. 26, so as to match the nozzle pitch of the ink jet heads in the X direction to the pixel pitch of the color filter. With the present embodiment, the head unit 606 is rotated on the G head (121*a* and 121*b*), and adjustment is made to an angle whereby pixels on the substrate can be colored by the nozzles of the G head (121*a* and 121*b*). Also, following setting of the rotational angle of the entire head unit, i.e., setting of the rotational angle of the G head, adjustment of rotational angle is performed for the R head and B head relative to the G head. In this case, the rotational angle of all heads is determined so that the nozzle pitch in the X direction matches the pixel pitch.

Next, as shown in FIG. 26, in step S3 the head mounting portions 1000 and 1002 upon which the R head (120*a* and 120*b*) and the B head (122*a* and 122*b*) are mounted are moved in the nozzle array direction and position adjustment is performed for the head mounting portions, so that pixels on the substrate can be colored with the R head (120*a* and 120*b*) and the B head (122*a* and 122*b*) as well. Executing the above steps S1 through S3 completes positioning of the heads to the substrate. The color filter can be colored with these adjustments alone, but further positional adjustment is preferable in order to manufacture a finer color filter with defects such as mixing of colors and blank spots being reduced even further. With the present embodiment, the steps of steps S4 through S6 described next are subsequently performed.

Next, in step S4, ink is discharged toward the substrate from the nozzles of the multiple ink jet heads, thereby forming an ink dot placement adjusting pattern. Note that the substrate used here may be a substrate wherein an ink accepting layer has been formed on a glass substrate having a black matrix, or may be a substrate wherein an ink accepting layer has been formed on a plain glass plate.

Next, in step S5, the ink dot placement adjusting pattern is read, and judgement is made where there is positional offset in the ink dot placement. In the event that there is no positional offset in the ink dot placement, this means that positional adjustment has been performed correctly, and thus positional adjustment of the heads relative to the substrate is completed. Then the flow proceeds to step S7, ink is discharged from the heads, and coloring of the color filter is started.

On the other hand, in step S5, in the event that there is positional offset in the ink dot placement, the flow proceeds to step S6, and positional adjustment is performed again. In this step S6, positional offset in the ink dot placement is eradicated by performing at least one of: distance adjustment between heads on the head mounting portions (the adjustment in step S1), angle adjustment of head units (the adjustment in step S2), and adjustment of the head mounting portions in the nozzle row direction (the adjustment in step S3). In the event that the re-adjustment does away with the positional offset, the flow proceeds to step S7, and coloring of the color filter is started.

Figure 25:
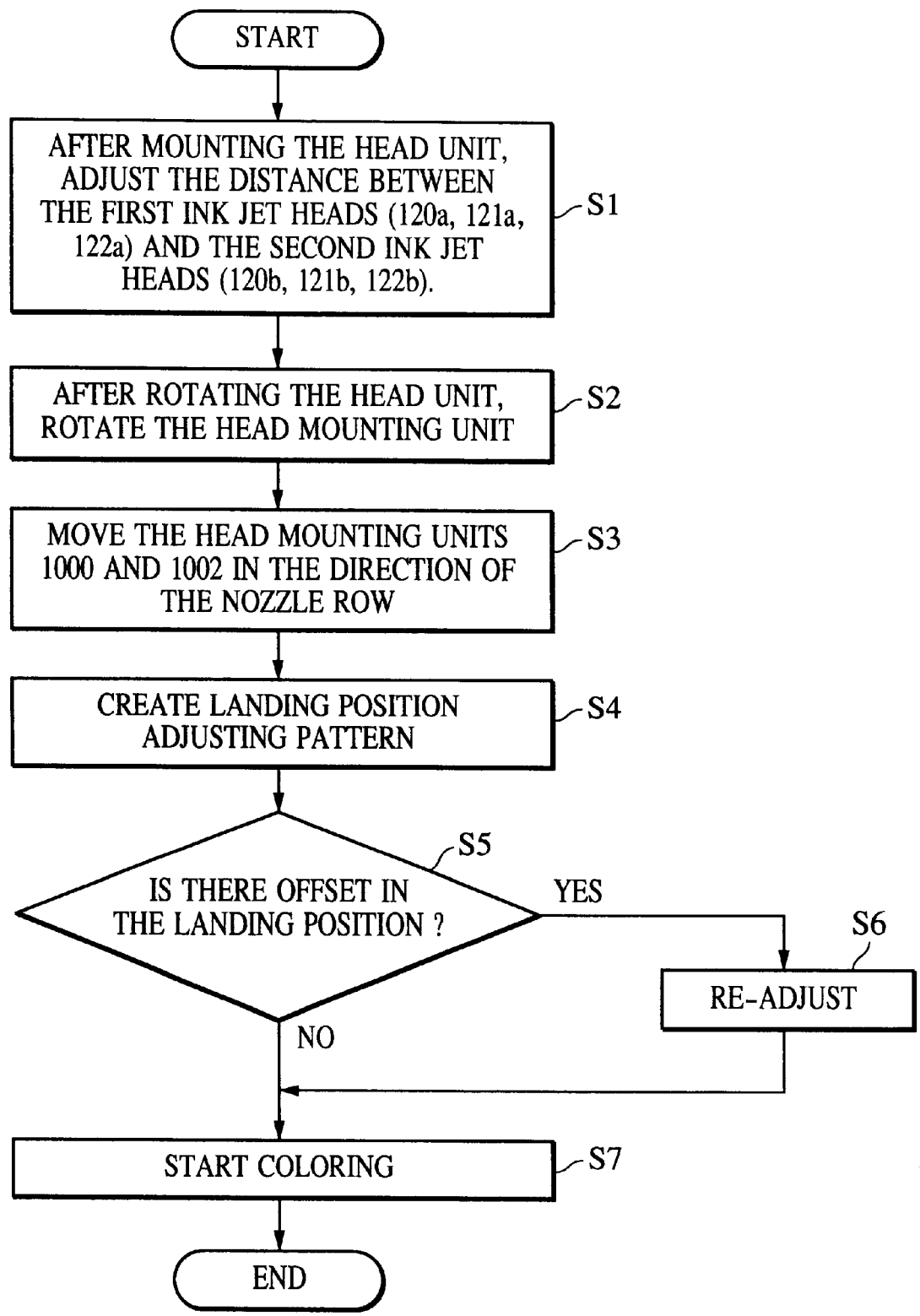
FIG. 25 is a flowchart illustrating the coloring operation of the color filter according to the first embodiment.

Now, although the present embodiment described with reference to the flowchart in FIG. 25 involves the re-adjustment of the spacing between the first ink jet heads (120*a*, 121*a*, and 122*a*) and second ink jet heads (120*b*, 121*b*, and 122*b*) being performed after completing the angle adjustment of the head units and the positional adjustment of the head mounting units in step S6, an arrangement may be used wherein the re-adjustment is performed before the angle adjustment of the head units and the positional adjustment of the head mounting units. That is to say, following step S1 in FIG. 25, ink is discharged in a substrate to form an ink dot placement adjusting pattern, the pattern is read, and re-adjustment is made based on the reading results. This allows the distance adjusting between the heads on the head mounting portions to be performed in a more precise manner, and the distance between the heads to be accurately set to the desired distance.

According to the present embodiment thus described, a positional adjusting mechanism wherein the spacing between multiple ink jet heads mounted on one head mounting portion can be easily adjusted is provided, so positional adjusting between heads can be easily performed even in the event that the number of heads being used is increased, and consequently, prolonged periods of time are no longer necessary for positioning the heads such as conventionally occurred due to the increase in the number of heads, and also the color filter is colored using head units having multiple heads of the same color, so the area which can be colored at once is wider than with conventional arrangements, which leads to proportionate reduction in coloring time. Also, large substrates can be colored by proportionately increasing the number of heads, thereby allowing color filters to be manufactured without reducing production.

(Second Embodiment)

With the first embodiment, description has been made regarding an arrangement wherein the nozzle pitch of the two ink jet heads (the first ink jet head and the second ink jet head) are equal, but description will be made with this second embodiment regarding an arrangement wherein the nozzle pitches of the first ink jet head and the second ink jet head are not equal. The present embodiment is identical to the first embodiment in all other ways, and corresponding description thereof will be omitted.

With the present embodiment, description will be made regarding a case of using an ink jet head having 200 nozzles and a designed nozzle pitch of 300 $\mu$m (=0.3 mm). In this case, the spacing of the nozzles at both ends is 59.700 mm (=(200−1)×0.3 mm), as far as the designed value goes. However, in practice, measuring the nozzle pitch of ink jet heads reveals that there are irregularities of around ±50 $\mu$m as to the designed value. That is, the actually measured values will be scattered throughout a range of 59.650 through 59.750 mm. Particularly, this irregularity is great with ink jet heads from different manufacturing lots, and there may be irregularities of around ±50 $\mu$m.

Now, let us say that the distance between the nozzles at both ends of a first ink jet head 120*a* is 59.650 mm, and that the distance between the nozzles at both ends of a second ink jet head 120b is 59.750 mm. At this time, the average nozzle pitch of the first ink jet head is 299.749 μm (=59.650×100/(200−1) μm). In the event of manufacturing a color filter such as shown in FIG. 10, using such first and second ink jet heads, there is the need to set the head inclination angle $\theta = \cos^{-1}(264/299.749) = 28.268527560°$ in order to match the nozzle pitch with the pixel pitch of 264 μm in the X direction. Also, at this time, the spacing of the nozzles at the ends of the first ink jet head 120a in the X direction is 52.536 mm (=264/100 ×(200−1) mm), which is equal to a natural multiple of the pixel pitch 264 μm.

Also, the second ink jet head 120b is mounted to the same head mounting portion as the first ink jet head, and accordingly the head inclination angle θ also is the same as that of the first ink jet head 120a. Taking this into consideration, the spacing between the nozzles at both ends of the second ink jet head 120b in the X direction is 52.624074 mm (=59.750× COS 28.26852756° mm). This shows that a difference of 88.074 μm (=100×(52.624−52.536) mm) has occurred in comparison to the spacing between the nozzles at both ends of the first ink jet head 120a in the X direction of 52.536 mm.

Performing coloring using a head unit with a difference of 88.074 μm as described above results in coloring defects of pixels. That is, the length 88.074 μm is equivalent to approximately ⅓ of the length of the pixel pitch (264 μm), and this means that in the event that coloring is performed in this state, even though the first nozzle of the second ink jet head 120b (120b-N1: the closest nozzle to the first ink jet head) can discharge ink to pixels of the corresponding color, the 200th nozzle of the second ink jet head 120b (120b-N200: the farthest nozzle from the first ink jet head) cannot discharge ink to pixels of the corresponding color, and instead discharges ink to pixels adjacent to the pixels for which it was intended. Thus, in the event that the nozzle pitch of the two heads set to the same head mounting unit are different, ink cannot be discharged to the desired places, resulting in problems in manufacturing color filters. In order to avoid this problem, there is the need to set ink jet heads with around the same degree of irregularities in nozzle pitch on the head mounting unit. Ideally, heads with identical nozzle pitches should be used, but irregularities are unavoidable in the head manufacturing process, so manufacturing heads with perfectly identical nozzle pitches is difficult. Accordingly, with the present embodiment, heads with nozzle pitch irregularities a within a predetermined range are selected and used for the same head setting units, so that highly fine color filters can be manufactured even with differing nozzle pitches. Specifically, a head unit is used wherein the nozzle pitch irregularities $\delta(=|m_1(n-1)-m_2(n-1)|)$ are in the range of $0<\delta=|m_1(n-1)-m_2(n-1)|(\mu m) \leq 5$, preferably $0<\delta=|m_1(n-1)-m_2(n-1)|(\mu m) \leq 2$ and even more preferably $0<\delta=|m_2(n-1)-1|m)<1$, wherein the average value of the ink discharging orifice pitch of the first ink jet head is represented by $m_1$, the average value of the ink discharging orifice pitch of the second ink jet head is represented by $m_2$, and the number of nozzles of the first ink jet head and the second ink jet head is represented by n. In other words, a head unit is used wherein the difference δ between the distance between both ends of the used nozzles (used ink discharge orifices) of the first ink jet head and the distance between both ends of the used nozzles (used discharge orifices) of the second ink jet head is within the range of $0 \leq \delta(\mu m) \leq 5$, preferably $0 \leq \delta(\mu m) \leq 2$, and even more preferably, $0 \leq \delta(\mu m) \leq 1$. That is, in the event of mounting N heads to the same head mounting portion, the configuration is to be such that the difference in nozzle pitch of the nozzles used at the ends of the N heads is within the above range.

This range of nozzle pitch irregularities is a range set such that ink can be discharged to desired positions even in the event that various types of irregularities exist, such as irregularities in the ink dot placement as to the nozzle position, irregularities in the diameters of dots, irregularities in the width and position of water-repellent portion (i.e., irregularities on the substrate), irregularities in positioning precision of the stage, and so forth. The above irregularities δ has been thus determined taking into consideration the margin of error of irregularities in the ink dot placement as to the nozzle position, irregularities in the diameters of dots, irregularities in the width and position of water-repellent portion (irregularities on the substrate), irregularities in positioning precision of the stage, and so forth, and color filters can be manufactured even with different pixel pitches, as long as kept within this range.

Thus, according to the present invention, mounting heads with around the same degree of irregularities in nozzle pitch on the same head mounting portion allows pixel coloring defects to be reduced. Also, even in the event that the nozzle pitches of the heads differ, keeping the nozzle pitch irregularities within a predetermined range allows color filters to be manufactured even with different pixel pitches.

(Third Embodiment)

The above first and second embodiments have been used as examples of a color filter for a display device panel, but with the third embodiment, an example of an EL (electroluminescence) display device will be described as an example of a display device panel. Other than that, the present embodiment is the same as the above first embodiment, so description thereof will be omitted here.

An EL display device is a device wherein a thin film containing inorganic and organic fluorescent compounds is formed into a configuration between a cathode and an anode, excitons are generated by injecting electrons and holes into the thin film so as to rejoin, and discharge of fluorescence or phosphorescence at the time of deactivation of the excitons is used for emitting light. Of the fluorescent materials used for such EL display devices, using materials which emit red, green, and blue light with the manufacturing apparatus according to the present invention (although FIG. 1 shows a color filter manufacturing apparatus configuration since description of the manufactured article was made with reference to a color filter, this can be an EL display device manufacturing apparatus if the object of manufacturing is an EL display device) and patterning these materials on a device substrate such as a TFT substrate or the like allows a self-illuminating full-color EL display device to be manufactured. The present invention encompasses the manufacturing method of such EL display devices and the manufacturing apparatuses, as well.

Also, the manufacturing apparatus according to the present invention may comprise means for carrying out surface processing steps such as plasma processing, UV processing, coupling processing, etc., on the surface of the resin resist, pixel electrodes, and layer to serve as the lower layer, so that the EL material will readily adhere.

Also, the EL display device manufactured with the manufacturing method according to the present invention can be applied to low-information fields such as segment display, full-screen simultaneous lighting, still-image display, etc., and can be used for light sources having point, linear, or planar forms. Further, in addition to passive-drive display devices, full-color display devices with high luminosity and excellent response can be obtained by using active devices such as TFTs for driving.

Figure 28:
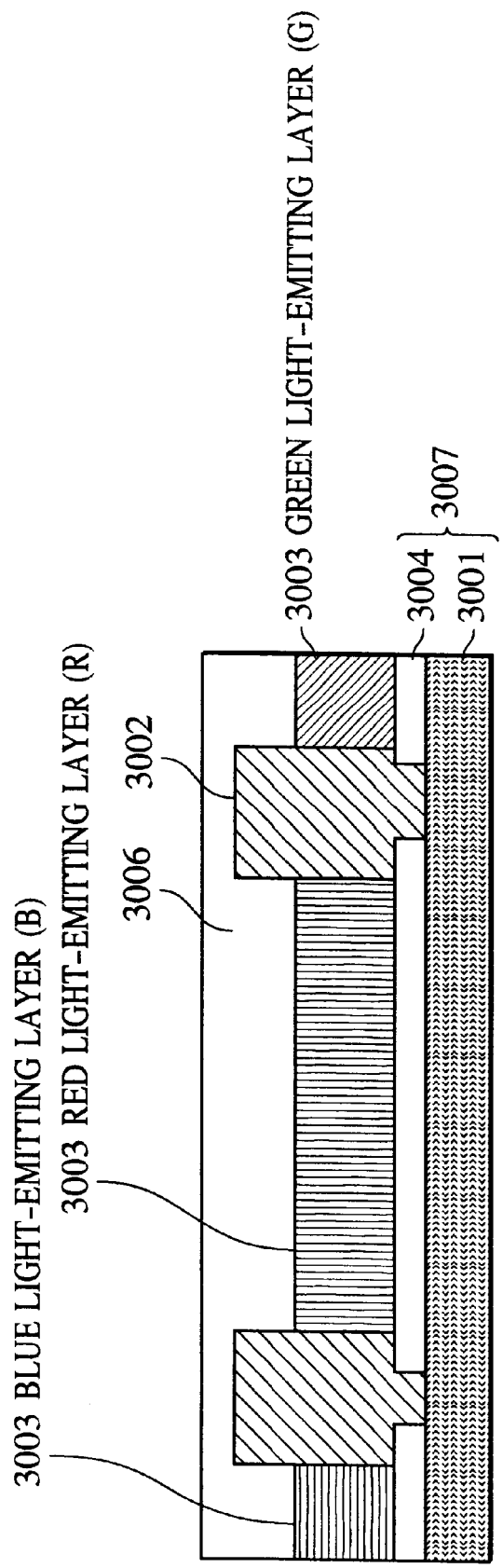
FIG. 28 is a cross-sectional diagram of the layered structure of an EL display device.
Figure 29A:
FIGS. 29A through 29D are diagrams illustrating an example of the manufacturing steps for an EL display device.
Figure 29B:
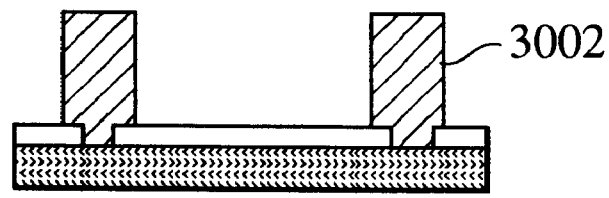
Figure 29C:
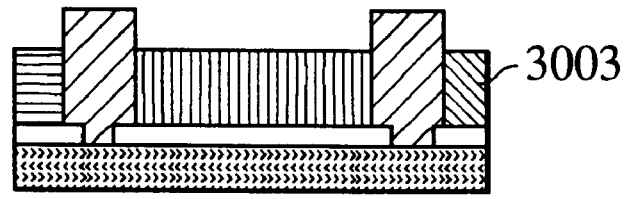
Figure 29D:
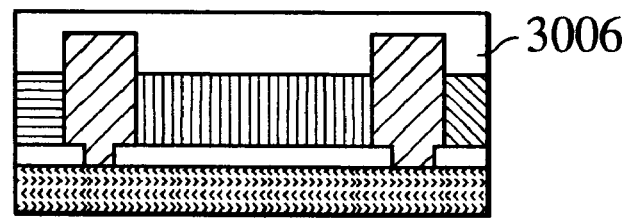

The following is an example of an organic EL device manufactured according to the present invention. FIG. 28 is a cross-sectional diagram of the layered structure of the organic EL device. The organic EL display device shown in FIG. 28 comprises a transparent substrate 3001, partitions (partitioning members) 3002, a luminous layer (light-emitting portion) 3003, transparent electrodes 3004, and a metal layer 3006. Also, reference numeral 3007 denotes a portion formed of the transparent substrate 3001 and the transparent electrodes 3004, and will be referred to as a driving substrate.

The transparent substrate 3001 is not restricted in particular as long as the article has necessary properties to serve as an EL display device, such as transparency, mechanical strength, and so forth; light-transmitting substrates such as glass substrates, plastic substrates, etc., may be used. The partitions (partitioning members) 3002 function to isolate the pixels one from another so that at the time of applying the material which becomes the luminous layer 3003 (i.e., the EL material liquid) the material of one pixel does not mix with the material of adjacent pixels. That is to say, the partitions 3002 function as walls to prevent mixing. Also, providing the partitions 3002 upon the transparent substrate 3001 forms multiple recesses (pixel areas) on the substrate. Incidentally, there is no problem at all with the partitions 3002 being of a multi-layer structure having different degrees of affinity as to the material. The luminous layer 3003 is formed of a material which emits light upon an electric current being applied thereto, such as known organic semiconductor material like polyphenylene vinylene (PPV), for example, layered to a thickness whereby sufficient light can be obtained, e.g., around 0.5 $\mu$m to 0.2 $\mu$m. The EL material liquid (also referred to as self-illuminating material or thin-film material liquid) is filled into the recesses surrounded by the partitions 3002 using the ink jet method and baked, thereby forming the luminous layer 3003. The transparent electrodes 3004 are configured of material which is both electroconductive and light-transmitting, such as ITO or the like, and are provided independently for each pixel area so as to allow light-emitting in increments of each pixel. The metal layer 3006 is formed layered of an electroconductive metal material, such as aluminum lithium (AlLi) to a thickness of around 0.1 $\mu$m to 1.0 $\mu$m, and is formed to act as a shared electrode facing the transparent electrodes 3004. The driving substrate 3007 has the thin film transistors (TFTs) not shown here, the wiring film, insulating film, etc., layered in a multi-layer fashion, and is configured such that voltage can be applied between the metal layer 3006 and the transparent electrodes 3004 in increments of each pixel. The driving substrate 3007 is manufactured by a known thin-film process.

With organic EL devices having the above layered configuration, electric current flows to the luminous layer 3003 at the pixel area where voltage has been applied between the transparent electrodes 3004 and the metal layer 3006, causing an electroluminescence phenomena, and light is emitted through the transparent electrodes 3004 and the transparent substrate 3001.

Now, description will be made regarding the steps for manufacturing the organic EL device. FIGS. 29A through 29D illustrate an example of the steps for manufacturing the organic EL device. The steps A through D will be described with reference to FIGS. 29A through 29D.

Step A: First, a glass substrate is used as the transparent substrate 3001, upon which are layered in multilayer fashion thin film transistors (TFTs) not shown, wiring film, insulating film, etc., and then the transparent electrodes 3004 are formed so that voltage can be applied to the pixel area.

Step B: Next, the partitions 3002 are formed at positions for each pixel. The partitions 3002 should function as walls to prevent mixing, so that at the time of applying the EL material liquid to form the luminous layer by ink jet, the EL material liquid does not mix with the material of adjacent pixels. Although the partitions 3002 are formed of resist with a black material added using photolithography, the present invention is not restricted to this, and various materials, colors, forming methods, etc., can be used.

Step C: Next, EL material liquid is filled into the recesses surrounded by the partitions 3002 using an ink jet method EL material liquid discharging head, and then baked, thereby forming the luminous layer 3003.

Step D: Further, a metal layer 3006 is formed on top of the luminous layer 3003.

Using these Steps A through D, a full-color EL device can be manufactured through simple steps. Particularly, in the event of forming color organic EL devices, there is the need to form a luminous layer for having different colors of light-emission such as red, green, and blue, so using an ink jet discharging head which can discharge desired EL material at arbitrary positions is advantageous.

With the present embodiment, distance adjusting of the ink jet heads is performed with the same method as the above-described first and second embodiments. That is, the distance between the first EL material discharging head and the second EL material discharging head for discharging light-emitting material which emits the same color is N times the nozzle pitch (wherein N is a natural number).

Also, with the present invention, a display portion is formed by providing material used for display to pixel areas provided with predetermined intervals therebetween on the substrate, wherein the colored portion is equivalent to this display portion for color filters, and wherein the light-emitting portion is equivalent to this display portion for EL display devices. The display portion including the above colored portion or light-emitting portion is the portion that is used for displaying information, and is the portion for visually recognizing colors.

Also, the colored portion of the color filter or the light-emitting portion of the EL device might be called a color emitting portion, since it is a portion where colors are generated (wherein colors are emitted). For example, in the case of a color filter, RGB light is emitted by light from the back-light passing through the colored portions, and in the case of an EL device, RGB light is emitted by the light emitting portion emitting light spontaneously.

Also, the ink and EL material liquid (self-illuminating material) are materials for forming the color-emitting portions, and thus can be understood to be materials which generate color emission. Also, the ink and EL material liquid (self-illuminating material) are liquids, and thus can be collectively referred to as liquid materials. Also, the ink and self-illuminating material are materials for forming the display portion used for display.

Also, with the present invention, ink jet heads are used for forming the color filter, and EL material liquid discharging heads are used for manufacturing the EL display device, but both the ink jet heads and EL material liquid discharging heads are for discharging liquid, and can be collectively referred to as liquid discharging heads.

Thus, the present invention is applicable to the manufacturing of panels used with color display device including, for example, color filters, EL devices, etc. Note that the panel for display devices according to the present invention is not restricted to the above color filters and EL display devices, but rather encompasses all panels formed by discharging liquid material onto pixel areas provided at predetermined intervals on a substrate which can be used for display devices.

(Other Embodiments)

The present invention is also applicable to modifications and variations of the above embodiments, within the spirit and scope of the invention. For example, in recent years, there are panels wherein the color filter is formed on the TFT array side, but the color filter defined in the present specification is a colored member colored by coloring material, and encompasses either arrangement regardless of whether the colored member is on the TFT side or not.

Also, the position adjusting device for performing position adjustment in the nozzle row direction of the liquid discharging heads may be fixed to the head mounting portion, or may be fixed to the liquid discharging heads. That is to say, the position adjusting device is fixed to only one or the other of the head mounting portion and the liquid discharging heads, and is mounted so as to move the other.

Also, the number of liquid discharging heads for discharging ink of the same color mounted on the same head mounting portion may be three, four, five, and so on. Also, the number of liquid discharging heads for discharging light emitting material for emitting light of the same color mounted on the same head mounting portion may be three, four, five, and so on. That is to say, having multiple heads is sufficient. The greater the number of liquid discharging heads mounted on the head mounting portion is, the wider the area which can be colored at one time is, which reduces manufacturing time.

Also, in the event of forming three liquid discharging heads (first through third heads) to the head mounting portion, a position adjusting device should be provided for the second head and third head. That is to say, in the event of mounting N heads (first through N'th heads) on the head mounting portion, a position adjusting device should be provided for the second head through N'th head.

Also, although the above embodiments describe liquid discharging heads with one of the multiple liquid discharging heads mounted to the head mounting portion being fixed, the invention is not restricted to this, and arrangements may be made wherein no heads are fixed. That is to say, arrangements may be made wherein position adjusting devices are provided for all liquid discharging heads, so that all of the liquid discharging heads are capable of performing position adjustment.

Figure 27:
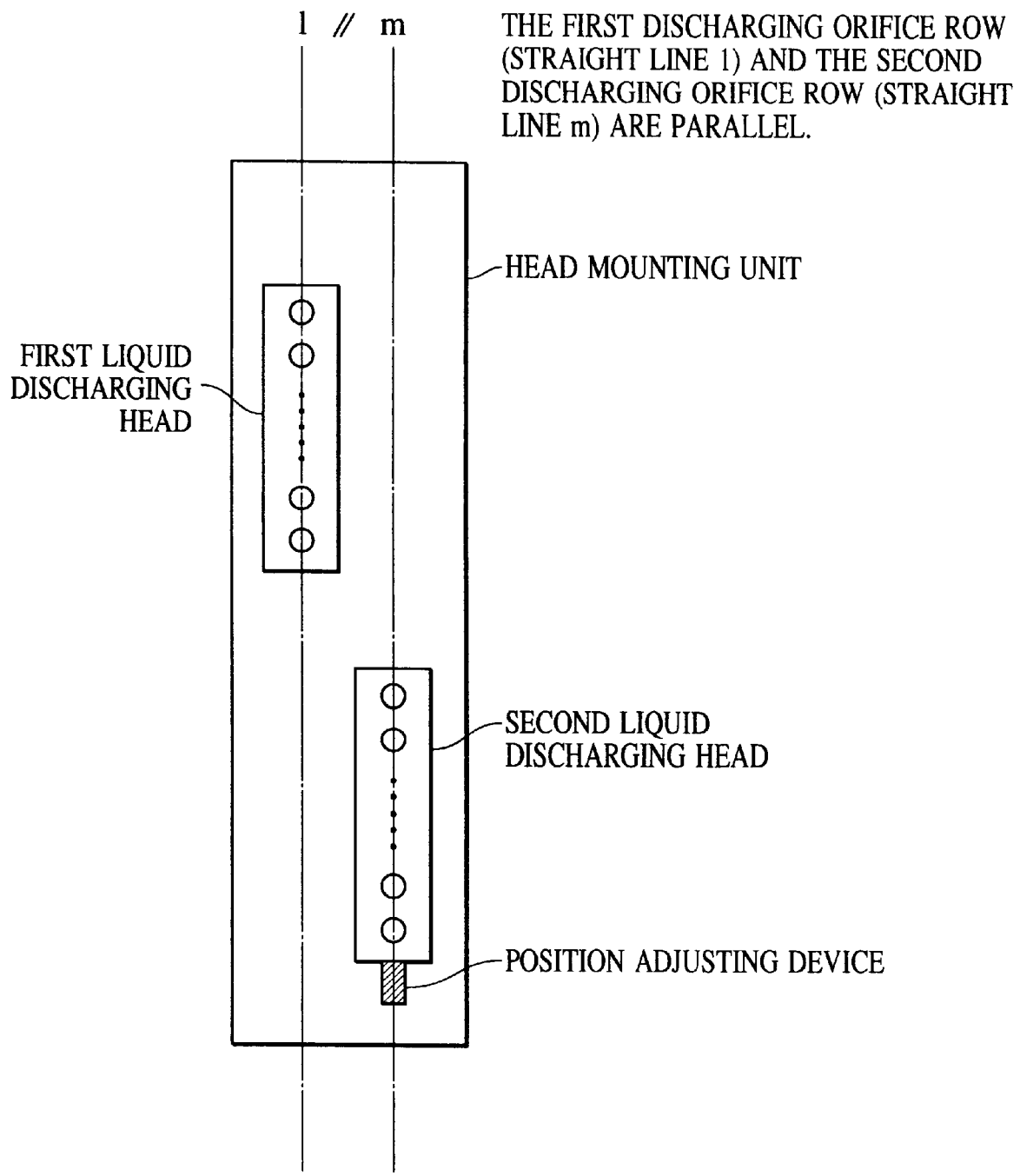
FIG. 27 is a diagram illustrating an example of a method for positioning the liquid discharging heads to be mounted on the head mounting portion.

Also, although the above embodiments describe both the first liquid discharging head and the second liquid discharging head being mounted on the head mounting portion such that the nozzle row of the first liquid discharging head (the first discharging orifice row) and the nozzle row of the second liquid discharging head (the second discharging orifice row) are arrayed on a single straight line, the present invention is not restricted to this arrangement. For example, a head positioning arrangement such as shown in FIG. 27 may be used in the event that the head nozzle pitch is a regular multiple of the pixel pitch of the color filter or EL device, and the display portion of the color filter or EL device can be formed without rotating the heads. That is to say, the heads should be mounted so that the first nozzle row (liquid discharging orifice row) and the second nozzle row (liquid discharging orifice row) assume the same direction.

Also, the operation for forming color filters and EL devices may be executed with the liquid discharging heads fixed and the stage moving, or with the stage stationary and the liquid discharging heads moving.

Also, although the above-described color filter manufacturing apparatus and EL display device manufacturing apparatus have two head units, the number of head units is not restricted to two; just one may be used, or three or more may be used. The fewer the number of head units, the shorter the time required for the relative positioning between the liquid discharging heads and the head units is, and control is also easy. On the other hand, the greater the number of head units, the greater the number of nozzles which can be used for forming the display portion is, so the area which can perform forming in one relative scan between the heads and substrate is that much wider, leading to reduction in the time for forming the display portion.

Also, with the above-described embodiments, description has been made regarding a case of using a bubble jet type apparatus using electro-thermal converters for the energy generating devices (energy providing means), but the present invention is not restricted to this; piezo-jet types wherein mechanical vibrations or displacement is applied to ink using piezoelectric devices may also be used, for example.

The present invention is applied to the print apparatus of the system, among various ink-jet recording systems, which has a means (e.g., an electricity-to-heat converter or laser light) for generating heat energy as energy used to discharge ink, and changes the state of the ink by using the heat energy. According to this system, a high-density, high-resolution recording operation can be realized.

As for the typical structure and principle, it is preferable that the basic structure disclosed in, for example, U.S. Pat. No. 4,723,129 or 4,740,796 is employed. The aforesaid method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electricity-to-heat converter disposed to face a sheet or a fluid passage which holds the fluid (ink) to a level higher than levels at which film boiling takes place, are applied to the electricity-to-heat converter in accordance with recording information so as to generate heat energy in the electricity-to-heat converter and to cause the heat effecting surface of the recording head to effect film boiling so that bubbles can be formed in the fluid (ink) to correspond to the one or more drive signals. The enlargement/contraction of the bubble will cause the fluid (ink) to be discharged through a discharging opening so that one or more inks are formed. If a pulse shaped drive signal is employed, the bubble can be enlarged/contracted immediately and properly, causing a further preferred effect to be obtained because the fluid (ink) can be discharged while revealing excellent response.

It is preferable that a pulse drive signal disclosed in U.S. Pat. No. 4,463,359 or 4,345,262 be employed. If conditions disclosed in U.S. Pat. No. 4,313,124, which describes an invention related to the temperature rising rate at the heat effecting surface, are employed, a satisfactory recording result can be obtained.

As an alternative to the structure (linear fluid passage or perpendicular fluid passage) of the recording head disclosed in each of the above-mentioned patents and having an arrangement that discharge ports, fluid passages and electricity-to-heat converters are combined, a structure having an arrangement that the heat effecting surface is disposed in a bent region as disclosed in U.S. Pat. No. 4,588,333 or 4,459,600 may be employed: In addition, the following structures may be employed: a structure having an arrangement that a common slit is formed to serve as a discharge section of a plurality of electricity-to-heat converters as disclosed in Japanese Patent Application Laid-Open No. 59-123670; and a structure disclosed in Japanese Patent Application Laid-Open No. 59-138461, in which an opening for absorbing pressure waves of heat energy is disposed to correspond to the discharge section.

Furthermore, as a recording head of the full line type having a length corresponding to the maximum width of a recording medium which can be recorded by the recording apparatus, either the construction which satisfies its length by a combination of a plurality of recording heads as disclosed in the above specifications or the construction as a single full line type recording head which has integrally been formed can be used.

In addition, the invention is effective for a recording head of the freely exchangeable chip type which enables electrical connection to the recording apparatus main body or supply of ink from the main device by being mounted onto the apparatus main body, or for a recording head of the cartridge type provided integrally on the recording head itself.

It is preferred to additionally employ recording head restoring means and auxiliary means as components of the present invention because the effect of the present invention can be further stabilized. Specifically, it is preferable to employ a recording head capping means, a cleaning means, a pressurizing or suction means, an electricity-to-heat converter, and another heating element or a sub-heating means constituted by combining them and means for controlling a sub-emitting mode in which an emitting is performed independently from the recording emitting in order to stably perform the recording operation.

Although a fluid ink is employed in the abovementioned embodiment of the present invention, an ink which is solidified at room temperature or lower as well as softened at the room temperature may be used. That is, any ink which becomes fluid when the recording signal is supplied may be employed.

Furthermore, an ink which is solidified when it is left to stand, and liquified when heat energy is supplied in accordance with a recording signal can be adapted to the present invention to positively prevent a temperature rise caused by heat energy by utilizing the temperature rise as energy for state transition from the solid state to the liquid state or to prevent ink evaporation. In any case, an ink which is liquified when heat energy is supplied in accordance with a recording signal so as to be discharged in the form of fluid ink, or an ink which is liquified only after heat energy is supplied, e.g., an ink which starts to solidify when it reaches a recording medium, can be adapted to the present invention. In the above-mentioned case, the ink may be of a type which is held as fluid or solid material in a recess of a porous sheet or a through-hole at a position to face the electricity-to-heat converter as disclosed in Japanese Patent Application Laid-Open No. 54-56847 or Japanese Patent Application Laid-Open No. 60-71260. It is the most preferred way for the ink to be adapted to the aforesaid film boiling method.

According to the present invention as described above, providing position adjusting mechanisms whereby the spacing between multiple liquid discharging heads mounted to a single head mounting portion can be easily adjusted, positional adjustment between heads can be easily performed even in the event that the number of heads used is increased, and consequently, productivity can be improved by the increase in the number of heads. Color filters can be manufactured using head units having multiple ink jet heads of the same color, so the area which can be colored at one time is larger than with conventional arrangements, and the amount of manufacturing time can be reduced proportionately. Also, EL display devices can be manufactured using head units having multiple ink jet heads of the same color, so the area which can be formed at one time is larger than with conventional arrangements, and the amount of manufacturing time can be reduced proportionately. Further, manufacturing large-size substrates can be dealt with by increasing the number of heads proportionately, and thus color filters and EL display devices can be manufactured without decrease in productivity.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A head unit used with an apparatus for manufacturing a panel for a display device comprising a plurality of display units, wherein said head unit and a substrate are scanned relatively while applying liquid to pixel areas on the substrate from said head unit, said head unit comprising:

a first liquid discharging head comprising a first liquid discharging orifice row including multiple liquid discharging orifices;

a second liquid discharging head comprising a second liquid discharging orifice row including multiple liquid discharging orifices;

a head mounting unit for arraying said first liquid discharging head and said second liquid discharging head in the same direction such that said first liquid discharging orifice row and said second liquid discharging orifice row are positioned in the same direction; and position adjusting means for adjusting a relative position of said first liquid discharging head and said second liquid discharging head by) moving at least one of said first liquid discharging head and said second liquid discharging head in the direction of said first and second liquid discharging orifice rows, wherein said position adjusting means effects adjusting such that a spacing between a first liquid discharging orifice of said first liquid discharging head and a first liquid discharging orifice of said second liquid discharging head is N times (wherein N is a natural number) the p, itch of the liquid discharging orifice of said first liquid discharging head.

2. A head unit according to claim 1, wherein the average value of the liquid discharging orifice pitch of said first liquid discharging head and the average value of the liquid discharging orifice pitch of said second liquid discharging head are equal.

3. A head unit according to claim 1, wherein the difference δ between the distance between both ends of the discharging orifice row of said first liquid discharging head and the distance between both ends of the discharging orifice row of said second liquid discharging head is represented by the expression $$o < \delta = |m_1(n-1) - m_2(n-1)|(\mu m) \leq 5,$$

wherein the average value of the liquid discharging orifice pitch of said first liquid discharging head is represented by $m_1$, the average value of the liquid discharging orifice pitch of said second liquid discharging head is represented by $m_2$, and the number of discharge orifices of said first liquid discharging head and said second liquid discharging head is represented by n.

4. A head unit according to claim 1, wherein the difference δ between the distance between both ends of the discharging orifice row of said first liquid discharging head and the distance between both ends of the discharging orifice row of said second liquid discharging head is represented by the expression $$o < \delta = |m_1(n-1) - m_2(n-1)|(\mu m) \leq 2,$$

wherein the average value of the liquid discharging orifice pitch of said first liquid discharging head is represented by $m_1$, the average value of the liquid discharging orifice pitch of said second liquid discharging head is represented by $m_2$, and the number of discharge orifices of said first liquid discharging head and said second liquid discharging head is represented by n.

5. A head unit according to claim 1, wherein the difference δ between the distance between both ends of the discharging orifice row of said first liquid discharging head and the distance between both ends of the discharging orifice row of said second liquid discharging head is represented by the expression $$o < \delta = |m_1(n-1) - m_2(n-1)|(\mu m) \leq 1,$$

wherein the average value of the liquid discharging orifice pitch of said first liquid discharging head is represented by $m_1$, the average value of the liquid discharging orifice pitch of said second liquid discharging head is represented by $m_2$, and the number of discharge orifices of said first liquid discharging head and said second liquid discharging head is represented by n.

6. A head unit according to claim 1, wherein said position adjusting means makes adjustments such that the spacing between a first liquid discharging orifice situated at the end of said first liquid discharging head and a second liquid discharging orifice situated at the end of said second liquid discharging head is the average value of the liquid discharging orifice pitch of said first liquid discharging head multiplied by a natural number.

7. A head unit according to claim 1, wherein said position adjusting means makes adjustments such that the spacing between a first liquid discharging orifice situated at the end of said first liquid discharging head and a second liquid discharging orifice situated at the end of said second liquid discharging head is the average value of the liquid discharging orifice pitch of said second liquid discharging head multiplied by a natural number.

8. A head unit according to claim 1, wherein said first liquid discharging head is a first ink jet head for discharging ink, and wherein said second liquid discharging head is a second ink jet head for discharging ink.

9. A head unit according to claim 8, wherein said first ink jet head and said second ink jet head discharge ink of the same color.

10. A head unit according to claim 9, comprising at least three types of head groups, each head group containing a first ink jet head and a second ink jet head.

11. A head unit according to claim 10, wherein said three types of head groups comprise an ink jet head group for discharging red color ink, an ink jet head group for discharging green color ink, and an ink jet head group for discharging blue color ink.

12. A head unit according to claim 10, wherein plural head mounting units are provided with each one of said mounting units corresponding to a respective one of said three types of head groups.

13. A head unit according to claim 12, wherein a predetermined head mounting unit of said plural head mounting units is fixed and other head mounting units are movable relative to the predetermined head mounting unit.

14. A head unit according to claim 8, wherein ink dot placement of ink discharged from at least one of said first ink jet head and said second ink jet head is measured, and adjustment is performed by said position adjusting means based on results of the measurement.

15. A head unit according to claim 8, wherein ink is discharged from said first and second ink jet heads to pixel areas on the substrate, thereby manufacturing the panel for the display device having a plurality of colored portions.

16. A head unit according to claim 15, wherein the panel for the display device having multiple colored portions comprises a color filter.

17. A head unit according to claim 1, wherein said first liquid discharging head is fixed and said second liquid discharging head is movable by said position adjusting means.

18. A head unit according to claim 1, wherein said first liquid discharging head comprises a first EL material liquid discharging head for discharging EL material liquid, and said second liquid discharging head comprises a second EL material liquid discharging head for discharging EL material liquid.

19. A head unit according to claim 18, wherein said first EL material liquid discharging head and said second EL material liquid discharging head discharge the EL material liquid which emits light of the same color.

20. A head unit according to claim 19, further comprising at least three types of head groups, each head group containing a first EL material discharging head and a second EL material discharging head.

21. A head unit according to claim 20, wherein said three types of head groups comprise a head group for discharging EL material liquid which emits light of a red color, a head group for discharging EL material liquid which emits light of a green color, and a head group for discharging EL material liquid which emits light of a blue color.

22. A head unit according to claim 18, wherein EL material liquid is applied from said first and second EL material discharging heads to the pixel areas on the substrate, thereby manufacturing the panel for the display device having a plurality of light-emitting portions.

23. A head unit according to claim 22, wherein the panel for the display device having the plurality of light-emitting portions is an EL display device.

24. A head unit according to claim 1, wherein adjustment is performed with said position adjusting means by applying voltage to said position adjusting means.

25. A head unit according to claim 1, wherein adjustment is performed with said position adjusting means by applying pneumatic pressure to said position adjusting means.

26. A head unit used with an ink jet recording device which records by relatively scanning said head unit and a recording medium while applying ink onto the recording medium, said head unit comprising:
   a first ink jet head comprising a first ink discharging orifice row including multiple ink discharging orifices;
   a second ink jet head comprising a second ink discharging orifice row including multiple ink discharging orifices;
   a head mounting unit for arraying said first ink jet head and said second ink jet head in the same direction such that said first ink discharging orifice row and said second ink discharging orifice row are positioned in the same direction; and position adjusting means for adjusting a relative position of said first ink jet head and said second ink jet head by moving at least one of said first ink jet head and said second ink jet head in the direction of said first and second ink discharging orifice rows, wherein said position adjusting means effects adjusting such that a spacing between a first ink discharging orifice of said first ink jet head and a first ink discharging orifice of said second ink jet head in is N times (wherein N is a natural number) the pitch of the ink discharging orifices of said first ink jet head.

27. A display device panel manufacturing apparatus for manufacturing panels for a display device comprising a plurality of display units, wherein a head unit and a substrate are scanned relatively while applying liquid to pixel areas on the substrate, said apparatus comprising:

a head unit comprising:
  a first liquid discharging head comprising a first liquid discharging orifice row including multiple liquid discharging orifices,
  a second liquid discharging head comprising a second liquid discharging orifice row including multiple liquid discharging orifices,
  a head mounting unit for arraying said first liquid discharging head and said second liquid discharging head in the same direction such that said first liquid discharging orifice row and said second liquid discharging orifice row are positioned in the same direction, and
  position adjusting means for adjusting a relative position of said first liquid discharging head and said second liquid discharging head by moving at least one of said first liquid discharging head and said second liquid discharging head in the direction of said first and second liquid discharging orifice rows;

scanning means for scanning said head unit and the substrate relatively; and control means for controlling such that liquid is discharged from said first and second liquid discharging heads of said head unit during the relative scanning by said scanning means so as to form a display portion on the substrate, wherein said position adjusting means effects adjusting before discharging of the liquid such that a spacing between a first liquid discharging orifice of said first liquid discharging head and a first liquid discharging orifice of said second liquid discharging head is N times (wherein N is a natural number) the pitch of the liquid discharging orifices of said first liquid discharging head.

28. A head unit according to claim 27, wherein said first liquid discharging head is fixed and said second liquid discharging head is movable by said position adjusting means.

29. A manufacturing apparatus according to claim 27, wherein said first liquid discharging head is a first ink jet head for discharging ink, and said second liquid discharging head is a second ink jet head for discharging ink.

30. A manufacturing apparatus according to claim 29, wherein said first ink jet head and said second ink jet head discharge ink of the same color.

31. A manufacturing apparatus according to claim 30, comprising at least three types of head groups, each head group containing a first ink jet head and a second ink jet head.

32. A manufacturing apparatus according to claim 31, wherein said three types of head groups comprise an ink jet head group for discharging red color ink, an ink jet head group for discharging green color ink, and an ink jet head group for discharging blue color ink.

33. A manufacturing apparatus according to claim 31, wherein plural head mounting units are provided with each one of said mounting units corresponding to a respective one of said three types of head groups.

34. A head unit according to claim 33, wherein a predetermined head mounting unit of said plural head mounting units is fixed and other head mounting units are movable relative to the predetermined head mounting unit.

35. A manufacturing apparatus according to claim 33, further comprising moving means for moving each of said mounting units provided corresponding to each of said head groups of each color in the direction of said first and second discharging orifice rows.

36. A manufacturing apparatus according to claim 35, wherein said moving means comprises a micrometer.

37. A manufacturing apparatus according to claim 33, further comprising rotating means for rotating each of said head mounting units of each color on axes perpendicular to the substrate.

38. A manufacturing apparatus according to claim 37, wherein said rotating means comprises a micrometer.

39. A manufacturing apparatus according to claim 37, wherein, following adjustment by said position adjusting means, said head mounting units are rotated by said rotating means, and further said mounting portions are moved in the array direction of said discharging orifices by moving means, thereby enabling coloring of pixel areas on the substrate by said ink jet heads of said head units.

40. A manufacturing apparatus according to claim 27, wherein ink is applied from said first and second liquid discharging heads to the pixel areas on the substrate, thereby manufacturing the panel for the display device having a plurality of colored portions.

41. A manufacturing apparatus according to claim 40, wherein the panel for the display device having the plurality of colored portions comprises a color filter.

42. A manufacturing apparatus according to claim 27, wherein said first liquid discharging head comprises a first EL material discharging head for discharging EL material, and said second liquid discharging head comprises a second EL material discharging head for discharging EL material.

43. A manufacturing apparatus according to claim 42, wherein EL material liquid is applied from said first and second EL material discharging heads to the pixel areas on the substrate, thereby manufacturing the panel for the display device having a plurality of light-emitting portions.

44. A manufacturing apparatus according to claim 43, wherein the panel for the display device having the plurality of light-emitting portions comprises an EL display device.

45. A manufacturing method for manufacturing panels for a display device comprising a plurality of display units, wherein a head unit comprising a plurality of liquid discharging heads and a substrate are scanned relatively while applying liquid to pixel areas on the substrate from the liquid discharging heads, said method comprising:

an adjusting step for adjusting a head unit, the head unit comprising:
  a first liquid discharging head comprising a first liquid discharging orifice row including multiple liquid discharging orifices,
  a second liquid discharging head comprising a second liquid discharging orifice row including multiple liquid discharging orifices, a head mounting unit for arraying the first liquid discharging head and the second liquid discharging head in the same direction such that the first liquid discharging orifice row and the second liquid discharging orifice row are positioned in the same direction, and position adjusting means for adjusting a relative position of the first liquid discharging head and the second liquid discharging head by moving at least one of the first liquid discharging head and the second liquid discharging head in the direction of the first and second liquid discharging orifice rows;

a scanning step for scanning the head unit and the substrate relatively; and a forming step for forming the display portion on the substrate by discharging liquid from the first and second liquid discharging heads of the head unit during the relative scanning;

wherein said adjusting step is effected with the position adjusting means before said forming step, such that a spacing between a first liquid discharging orifice of the first liquid discharging head and a first liquid discharging orifice of the second liquid discharging head is N times (wherein N is a natural number) the pitch of the liquid discharging orifices of the first liquid discharging head.

46. A manufacturing method according to claim 45, wherein the first liquid discharging head is a first ink jet head for discharging ink, and the second liquid discharging head is a second ink jet head for discharging ink.

47. A manufacturing method according to claim 46, wherein the first ink jet head and the second ink jet head discharge ink of the same color.

48. A manufacturing method according to claim 47, wherein at least three types of head groups are provided, each head group containing a first ink jet head and a second ink jet head.

49. A manufacturing method according to claim 48, wherein the three types of head groups comprise a head group for discharging red color ink, a head group for discharging green color ink, and a head group for discharging blue color ink.

50. A manufacturing method according to claim 49, wherein plural head mounting units are provided with each one of the mounting units corresponding to a respective one of the three types of head groups.

51. A manufacturing method according to claim 50, further comprising a moving step for moving each of the mounting portions provided corresponding to each of the head groups of each color in the array row direction of the discharging orifices.

52. A manufacturing method according to claim 50, further comprising a rotating step for rotating each of the head mounting portions on axes perpendicular to the substrate.

53. A manufacturing method according to claim 52, wherein, following adjustment in said adjusting step, the head mounting portions are rotated in said rotating step, and further the mounting portions are moved in the array direction of the ink discharging orifices, thereby enabling coloring of pixel areas on the substrate by the ink jet heads of the head units.

54. A manufacturing method according to claim 46, wherein ink is applied from the first and second ink jet heads to pixel areas on the substrate, thereby manufacturing the panel for the display device having a plurality of colored portions.

55. A manufacturing method according to claim 54, wherein the panel for the display device having the plurality of colored portions comprises a color filter.

56. A manufacturing method according to claim 45, wherein the first liquid discharging head comprises a first EL material discharging head for discharging EL material, and the second liquid discharging head is a second EL material discharging head for discharging EL material.

57. A manufacturing method according to claim 56, wherein EL material liquid is applied from the first and second EL material discharging heads to pixel areas on the substrate, thereby manufacturing the panel for the display device having a plurality of light-emitting portions.

58. A manufacturing method according to claim 57, wherein the panel for the display device having the plurality of light-emitting portions comprises an EL display device.

59. A method for manufacturing a liquid crystal display device comprising a color filter manufactured by relatively scanning a head unit having a plurality of ink jet heads and a substrate while applying ink to the substrate from the ink jet heads, thereby coloring a filter element which functions as the color filter, said method comprising:

an adjusting step for adjusting a head unit, the head unit comprising:

a first ink jet head comprising a first ink jet orifice row including multiple ink jet orifices, a second ink jet head comprising a second ink jet orifice row including multiple ink jet orifices, a head mounting unit for arraying the first ink jet head and the second ink jet head in the same direction such that the first ink jet orifice row and the second ink jet orifice row are positioned in the same direction, and position adjusting means for adjusting a relative position of the first ink jet head and the second ink jet head by moving at least one of the first ink jet head and the second ink jet head in the direction of the first and second ink jet orifice rows;

a scanning step for scanning the head unit and the substrate relatively;

a forming step for forming the color filter on the substrate by discharging ink from the first and second ink jet heads of the head unit during the relative scanning; and a step for sealing a liquid crystal compound between the color filter and an opposing substrate facing the color filter, wherein said adjusting step is effected with the position adjusting means before said forming step, such that a spacing between a first ink jet orifice of the first ink jet head and a first ink jet orifice of the second ink jet head is N times (wherein N is a natural number) the pitch of the ink jet orifices of the first ink jet head.

60. A method for manufacturing an apparatus comprising a liquid crystal display device having a color filter manufactured by relatively scanning a head unit having a plurality of ink jet heads and a substrate while applying ink to the substrate from the ink jet heads, thereby coloring a filter element which functions as the color filter, said method comprising:

an adjusting step for adjusting a head unit, the head unit comprising:

a first ink jet head comprising a first ink jet orifice row including multiple ink jet orifices, a second ink jet head comprising a second ink jet orifice row including multiple ink jet orifices, a head mounting unit for arraying the first ink jet head and the second ink jet head in the same direction such that the first ink jet orifice row and the second ink jet orifice row are positioned in the same direction, and position adjusting means for adjusting a relative position of the first ink jet head and the second ink jet head by moving at least one of the first ink jet head and the second ink jet head in the direction of the first and second ink jet orifice rows;

a scanning step for scanning the head unit and the substrate relatively;

a forming step for forming the color filter on the substrate by discharging ink from the first and second ink jet heads of the head unit during the relative scanning;

a step for sealing a liquid crystal compound between the color filter and an opposing substrate facing the color filter so as to manufacture the liquid crystal display device; and a step for connecting to the liquid crystal display device image signal supplying means for supplying image signals to the liquid crystal display device, wherein said adjusting step is effected with the position adjusting means before said forming step, such that a spacing between a first ink jet orifice of the first ink jet head and a first ink jet orifice of the second ink jet head is N times (wherein N is a natural number) the pitch of the ink jet orifices of the first ink jet head.

* * * * *

UNITED STATES PATENT AND TRADEMARK OFFICE
CERTIFICATE OF CORRECTION

PATENT NO. : 6,667,795 B2
DATED : December 23, 2003
INVENTOR(S) : Shigemura

It is certified that error appears in the above-identified patent and that said Letters Patent is hereby corrected as shown below:

Column 3,
Line 19, "of" should be deleted.
Line 45, "color;" should read -- color --.
Line 46, "Further" should read -- Further, --.

Column 8,
Line 39, "method" should read -- method, --.

Column 10,
Line 49, "Generally" should read -- Generally, --.

Column 15,
Line 7, "harness 620" should read -- harness 620, --.

Column 25,
Line 6, "$\theta=COS^{-1}(264/299.749)=28.268527560°$" should read -- $\theta=COS^{-1}(264/299.749)=28.26852756°$ --.
Line 44, "a" (first occurrence) should be deleted.
Line 49, "$0<\delta=|m_1(n-1)-m_2(n-1)|)\mu m)\leq 5,$" should read -- $O<\delta=|m_1(n-1)-m_2(n-1)|(\mu m)\leq 5,$ --
Line 51, "$0<\delta=|m_2(n-1)-1)|m)<1,$" should read -- $0<\delta=|m_1(n-1)-m_2(n-1)|)\mu m)\leq 1,$ --.

Column 27,
Line 39, "is formed layered" should read -- is a formed layer --.

Column 28,
Line 64, "device" should read -- devices --.

Column 30,
Line 66, "employed:" should read -- employed. --.

Column 32,
Line 41, "by)" should read -- by --.
Line 50, "p,itch" should read -- pitch --.
Line 64, "$0<\delta=\mu m_1(n-1)-m_2(n-1)|(\mu m)\leq 5,$" should read -- $0<\delta=|m_1(n-1)-m_2(n-1)|(\mu m)\leq 5,$ --.

UNITED STATES PATENT AND TRADEMARK OFFICE
CERTIFICATE OF CORRECTION

PATENT NO. : 6,667,795 B2
DATED : December 23, 2003
INVENTOR(S) : Shigemura

It is certified that error appears in the above-identified patent and that said Letters Patent is hereby corrected as shown below:

Column 35,
Line 12, "in" should be deleted.

Signed and Sealed this

Third Day of August, 2004

JON W. DUDAS
*Acting Director of the United States Patent and Trademark Office*